US012753315B2

(12) United States Patent
Knoote et al.

(10) Patent No.: US 12,753,315 B2
(45) Date of Patent: Oct. 6, 2026

(54) RETROREFLECTIVE COMPOSITION FOR INDUSTRIAL 3D SPRAYING OF LARGE SURFACES

(71) Applicant: Ink Invent IP B.V., Nieuwegein (NL)

(72) Inventors: Jacques Arthur Knoote, Zoetermeer (NL); Paul Willem Mijnen, Utrecht (NL); Harald Paul Kerres, Zoetermeer (NL); Philippus Jacob Muis, Andel (NL); Menno Arthur Knoote, The Hague (NL)

(73) Assignee: INK INVENT IP B.V., Nieuwegein (NL)

( * ) Notice: Subject to any disclaimer, the term of this patent is extended or adjusted under 35 U.S.C. 154(b) by 86 days.

(21) Appl. No.: 18/561,913

(22) PCT Filed: May 16, 2022

(86) PCT No.: PCT/EP2022/063160
§ 371 (c)(1),
(2) Date: Nov. 17, 2023

(87) PCT Pub. No.: WO2022/243231
PCT Pub. Date: Nov. 24, 2022

(65) Prior Publication Data
US 2024/0228790 A1 Jul. 11, 2024

(30) Foreign Application Priority Data
May 18, 2021 (EP) .................................... 21174399

(51) Int. Cl.
*C09D 5/33* (2006.01)
*C08K 3/08* (2006.01)
(Continued)

(52) U.S. Cl.
CPC ................ *C09D 5/004* (2013.01); *C08K 3/40* (2013.01); *C09D 7/20* (2018.01); *C09D 7/43* (2018.01);
(Continued)

(58) Field of Classification Search
None
See application file for complete search history.

(56) References Cited

U.S. PATENT DOCUMENTS 3,228,897 A 1/1966 Nellssen
4,082,427 A 4/1978 Nakashima
(Continued)

FOREIGN PATENT DOCUMENTS

CN 105349145 A 2/2016
CN 105440933 A 3/2016
(Continued)

OTHER PUBLICATIONS

English translation of Murai (JP 2017/101194) (Year: 2017).*
(Continued)

*Primary Examiner* — Ronak C Patel
(74) *Attorney, Agent, or Firm* — DINSMORE & SHOHL LLP

(57) ABSTRACT

The invention provides a retror effective ink, coating or paint composition consisting, based on the total weight of the composition, of: • 15-75 wt. % of solvent; 1-85 wt. % of spherical glass beads having a median particle diameter D50, as measured with laser diffraction, between 1 and 150 μm, and a refractive index, measured at a wavelength λ of 589 nm, between 1.5 and 2.8, wherein optionally at least part of the spherical glass beads are hemi spherically coated with a light-reflective coating; 0.05-2.5 wt. % of one or more thickeners; and 0.20-4.5 wt. % of synthetic pigment flakes having an average diameter between 1 and 75 μm, a thick-
(Continued)

ness smaller than 1 pm and an aspect ratio (flake diameter/thickness) of at least 10; 0-2 wt. % of one or more pigment flakes or particles (D) other than synthetic pigment flakes (A), (B) and (C); • 0-30 wt. % of one or more further ingredients, wherein the combined amount of the synthetic pigment flakes (A), (B) and (C) and the one or more pigments flakes or particles (D) is between 0.20 and 4.5 wt. %.

17 Claims, 1 Drawing Sheet

(51) Int. Cl.

| | |
|---|---|
| ***C08K 3/34*** | (2006.01) |
| ***C08K 3/40*** | (2006.01) |
| ***C08K 7/20*** | (2006.01) |
| ***C08K 9/02*** | (2006.01) |
| ***C09D 7/20*** | (2018.01) |
| ***C09D 7/40*** | (2018.01) |
| ***C09D 7/43*** | (2018.01) |
| ***C09D 7/61*** | (2018.01) |
| ***C09D 7/62*** | (2018.01) |

(52) U.S. Cl.

CPC ................. *C09D 7/61* (2018.01); *C09D 7/62* (2018.01); *C09D 7/69* (2018.01); *C09D 7/70* (2018.01); *C08K 2003/0812* (2013.01); *C08K 3/34* (2013.01); *C08K 7/20* (2013.01); *C08K 9/02* (2013.01); *C08K 2201/003* (2013.01)

(56) References Cited

U.S. PATENT DOCUMENTS

| | | | | |
|---|---|---|---|---|
| 5,574,081 | A | 11/1996 | Kroon | |
| 6,783,584 | B2 * | 8/2004 | Takahashi | C08K 9/02 106/404 |

FOREIGN PATENT DOCUMENTS

| | | | | |
|---|---|---|---|---|
| CN | 111819475 | A | 10/2020 | |
| EP | 0305074 | A2 | 3/1989 | |
| GB | 948259 | | 1/1960 | |
| GB | 948258 | A | 1/1964 | |
| JP | S5317643 | A | 2/1978 | |
| JP | 2002275039 | A | 9/2002 | |
| JP | 2002296410 | A | 10/2002 | |
| JP | 2006143798 | A | 6/2006 | |
| JP | 2019043997 | A | 3/2019 | |
| JP | 2021013898 | A | 2/2021 | |
| WO | 0042113 | A1 | 7/2000 | |
| WO | 0116223 | A1 | 3/2001 | |
| WO | 03016964 | A2 | 2/2003 | |
| WO | 2004017104 | A1 | 2/2004 | |
| WO | 2012034640 | A1 | 3/2012 | |
| WO | 2014109564 | A1 | 7/2014 | |
| WO | 2020096626 | A1 | 5/2020 | |
| WO | WO-2021198121 | A1 * | 10/2021 | C09D 175/04 |
| WO | 2023198829 | A1 | 10/2023 | |

OTHER PUBLICATIONS

English translation of Ryuzaki et al. (JP 2010-209167). (Year: 2010).*

International Search Report and Written Opinion pertaining to Application No. PCT/EP2022/063160 dated Sep. 8, 2022, 11 pages.

* cited by examiner

RETROREFLECTIVE COMPOSITION FOR INDUSTRIAL 3D SPRAYING OF LARGE SURFACES

CROSS REFERENCES TO RELATED APPLICATIONS

This application is a national-stage application under 35 U.S.C. § 371 of International Application No. PCT/EP2022/063160, filed May 16, 2022, which International Application claims benefit of priority to European Patent Application No. 21174399.2, filed May 18, 2021.

FIELD OF THE INVENTION

The invention relates to retroreflective ink, coating or paint compositions and to methods for their preparation. The invention further relates to a process for coating a substrate with a retroreflective layer using said retroreflective ink, coating or paint compositions and to substrates coated with a retroreflective layer obtainable by said process.

BACKGROUND OF THE INVENTION

Retroreflective paints, inks and coatings are used in a variety of applications. For example to improve the visibility of road signs, road markers, textiles, cars, et cetera, under dark conditions. Paints, inks and coatings are typically provided with retroreflective properties by adding spherical glass beads having a specific refractive index. Retroreflection occurs by the tandem action of refraction of the incident light through the upper surface of a spherical glass bead, internal reflection from the lower onside surface of the spherical glass bead and subsequent refraction of the light as it exits the upper surface of the spherical glass bead, travelling back to the direction from which the impinging light came.

WO2004/017104A2 discloses retroreflective compositions comprising retroreflective microspheres, a binder system and a thixotropic blend comprising at least two thixotropic agents in an amount of from about 2 to about 5 wt. %, based on the retroreflective composition. The retroreflective compositions are intended to be used as paints, inks and coatings and are applied to a substrate using aerosols applicators with a propellant.

WO01/16223A1 concerns retroreflective inks for printing on textiles. The single example of WO01/16223A1 discloses a screen printing ink. Screen printing inks are not suitable for professional or industrial (high-speed) spraying. It is generally known to the skilled person in the field of printing that the rheological characteristics of screen printing inks and inks for professional or industrial (high-speed) spraying are fundamentally different because of the fundamentally different techniques used to apply them to a substrate.

WO00/42113A1 concerns retroreflective inks comprising microbeads in a liquid carrier medium. The inks are intended for screen printing on textile.

WO2003/016964A2 concerns a retroreflective coating system and a method of providing the coating system on a substrate. The method comprises the steps of:

(a) applying a colour-providing composition to the substrate thereby forming an uncured film layer of the colour-providing composition; and (b) applying an at least partially-transparent clearcoat composition wet-on-wet to the uncured film layer of the colour-providing composition thereby forming an uncured film layer of the clearcoat composition on the uncured film layer of the colour-providing composition; wherein at least one of the colour-providing composition and the clearcoat composition is cross-linkable, and at least one of the colour-providing composition and the clearcoat composition comprises retroreflective microspheres to provide the retroreflective coating system on the substrate. The pigmented basecoat composition comprises from 5 to 40 parts by weight of pigment, for example flake-like aluminium pigment, based on 100 parts by weight of the pigmented basecoat composition, such as from 8 to 25 parts by weight.

As will be generally appreciated by those skilled in the art, when substrates are to be coated or painted, one would like to provide the intended effect of the coating or paint across the whole surface, irrespective of inhomogeneities of or on the surface of the substrate. Obviously, in case substrates are to be provided with retroreflective properties, one would like to realize homogeneous retroreflectivity across the whole surface. Likewise, in case substrates are to be provided with a coloured layer of a coating or paint, it is required that colour differences present on the substrate to be coated or painted are not visible anymore through the coloured layer of coating or paint, i.e. the coloured layer of coating or paint should be sufficiently opaque. In what follows, the term 'being sufficiently opaque' will be replaced with 'having sufficient coverage' or 'having sufficient hiding capacity'. In the context of the present invention, these three terms relate to an ink, paint or coating formulation that, when applied onto the substrate, mask any colour differences present on the surface of the substrate. As is generally known to those skilled in the art, the problem of inhomogeneities in colour is more common on large substrates, such as for example the coach-work of a car that needs to be painted or coated.

The inventors have found that the retroreflective properties and coverage properties of prior art coatings or paints comprising both pigments and retroreflective spherical glass beads are conflicting in the sense that the amount of pigment typically needed to obtain sufficient coverage to a large extent diminishes or even completely destroys the retroreflective properties.

FIG. 4 of WO2003/016964A2 discloses a coating system with aluminum pigment wherein retroreflective microspheres are disposed in the pigmented basecoat film layer. As explained supra, WO2003/016964A2 teaches that the pigmented basecoat composition comprises from 5 to 40 parts by weight of pigment, for example flake-like aluminium pigment, based on 100 parts by weight of the pigmented basecoat composition, such as from 8 to 25 parts by weight. As shown in the appended examples, the inventors found that using at least 5 parts by weight of pigment in a basecoat composition wherein retroreflective microspheres are disposed has a detrimental effect on the retroreflective properties of the basecoat film layer.

This problem can be solved by first applying a base layer comprising pigment in an amount to provide sufficient coverage and then applying a second layer comprising retroreflective spherical glass beads on top of the base layer. The Example in FIG. 1 and in paragraphs [00043]-[00046] of WO2003/016964A2 discloses for example a retroreflective coating system comprising retroreflective microspheres disposed in a mid-coat film layer between a pigmented basecoat film layer and a clearcoat film layer. This solution, however, requires a process for the manufacture that is less preferred in that it comprises subsequent painting or coating steps with different compositions.

There is a need for retroreflective ink, coating or paint compositions that are stable on the shelf and that can still be easily applied to a variety of substrates, preferably using professional or industrial (high-speed) spraying, resulting in retroreflective layers or coatings with good coverage.

Accordingly, it is an object of the invention to provide retroreflective ink, coating or paint compositions that have a sufficient stability or shelf-life and that can be professionally or industrially applied to a variety of substrates, preferably using professional or industrial (high-speed) spraying.

It is a further object of the invention to provide retroreflective ink, coating or paint compositions that can be professionally or industrially applied to a variety of substrates, preferably using professional or industrial (high-speed) spraying, resulting in retroreflective layers or coatings with good coverage.

It is yet another object of the invention to provide a simplified process for the production of retroreflective layers with good coverage on large surfaces, such as on the coach-work of a car, preferably using professional or industrial (high-speed) spraying.

SUMMARY OF THE INVENTION

The inventors have unexpectedly established that one or more of the objectives can be met by using an ink, coating or paint composition comprising retroreflective spherical glass beads and a reduced amount of pigment in the form of flakes having a specific size.

Accordingly, in a first aspect, the invention provides a retroreflective ink, coating or paint composition consisting, based on the total weight of the composition, of:

- 15-75 wt. % of solvent;
- 1-85 wt. % of spherical glass beads having a median particle diameter D50, as measured with laser diffraction, between 1 and 150 μm, and a refractive index, measured at a wavelength λ of 589 nm, between 1.5 and 2.8;
- 0.05-2.5 wt. % of one or more thickeners; and
- 0.20-4.5 wt. % of synthetic pigment flakes having an average diameter of between 1 and 75 μm, a thickness smaller than 1 μm and an aspect ratio (flake diameter/thickness) of at least 10, wherein said synthetic pigment flakes are chosen from (A), (B), (C) or a combination thereof:
  - (A) Metal flakes or synthetic mica flakes, optionally coated with at least one layer of one or more components chosen from the group consisting of metal oxides, metals, metal sulphides, titanium suboxides, titanium oxynitrides, FeO(OH), $SiO_2$, $B_2O_3$, $GeO_2$, $MgF_2$, metal alloys, rare earth compounds, and optionally coated with an outer layer comprising one or more colourants and a binder;
  - (B) Flakes comprising $Al_2O_3$, $SiO_2$, glass, ceramic, graphite or mica platelets coated with at least one layer of one or more components chosen from the group consisting of metal oxides, metals, metal sulphides, titanium suboxides, titanium oxynitrides, FeO(OH), $SiO_2$, $B_2O_3$, $GeO_2$, metal alloys, rare earth compounds, and optionally coated with an outer layer comprising one or more colourants and a binder;
  - (C) Flakes comprising $Al_2O_3$ platelets doped with one or more components chosen from the group consisting of $TiO_2$, $ZrO_2$, $SiO_2$, $SnO_2$, $In_2O_3$, ZnO and iron oxide, coated with at least one layer of one or more components chosen from the group consisting of metal oxides, metals, metal sulphides, titanium suboxides, titanium oxynitrides, FeO(OH), $SiO_2$, $B_2O_3$, $GeO_2$, metal alloys, rare earth compounds, and optionally coated with an outer layer comprising one or more colourants and a binder;
- 0-2 wt. % of one or more pigment flakes or particles (D) other than synthetic pigment flakes (A), (B) and (C);
- 0-30 wt. % of one or more further ingredients, wherein the combined amount of the synthetic pigment flakes (A), (B) and (C) and the one or more pigments flakes or particles (D) is between 0.20 and 4.5 wt. %, preferably between 0.20 and 4.0 wt. %.

The inventors have found that this composition can be applied, e.g. using professional or industrial (high-speed) spraying, to various substrates resulting in retroreflective coating layers with excellent coverage. Without wishing to be bound by any theory, the inventors hypothesize that the specific range of average (surface) diameters of between 1 and 75 μmm, such as between 5 and 50 μm of the synthetic pigment flakes and their smooth surface area provide sufficient coverage without considerably reducing reflection. Improved coverage typically implies less retroreflectivity. However, the reflection of the smooth surface area of the synthetic pigment flakes is believed to again improve retroreflectivity. Without wishing to be bound by any theory, the inventors further hypothesize that the very limited thicknesses of the synthetic pigment flakes—in the order of the wavelengths of visible light—further contributes to the retroreflective properties.

The inventors have further established that the retroreflective ink, coating or paint compositions can be applied to various substrates resulting in retroreflective coating layers with an excellent colour perception similar to that of ink, coating or paint compositions without retroreflective properties.

In a second aspect, the invention concerns a process for coating a substrate with a retroreflective layer, said process comprising the steps of:

- a) providing a substrate;
- b) optionally applying a primer layer to the substrate of step (a);
- c) optionally, but not preferably, applying a coloured base layer to the substrate of step (a) or to the primer layer of step (b);
- d) spraying the retroreflective ink, coating or paint composition as defined hereinbefore onto the substrate of step (a) or onto the layer of step (b) or (c) in an amount to provide between 0.25 and 30 $g/m^2$ of the combined amount of the synthetic pigment flakes (A), (B) and (C) and the one or more pigments flakes or particles (D);
- e) drying and curing the substrate coated with the retroreflective layer obtained in step (d); and
- f) optionally coating the dried substrate coated with the retroreflective layer obtained in step (e) with one or more further transparent coating layers followed by drying or curing.

In a third aspect, the invention concerns substrates coated with a retroreflective layer obtainable by the process for coating a substrate as defined herein.

Definitions

The term 'shear-thinning behaviour' in the context of the retroreflective ink, coating or paint composition of the present invention relates to a reduction of the viscosity when the retroreflective ink, coating or paint composition, initially being in a static situation, is subjected to a shear rate.

The term 'pigment' as used herein refers to particulate colourants, such as spherical parts or flakes. They are insoluble in the binder or solvent used.

The term 'dye' as used herein refers to colourants that can be molecularly dissolved in the binder or solvent used.

The term 'colourant' as used herein includes pigments as well as dyes.

The term 'titanium suboxides' as used herein refers to titanium oxide compound with the formula $Ti_nO_{2n-1}$, wherein n is an integer greater than 1.

DETAILED DESCRIPTION

Figure 1:
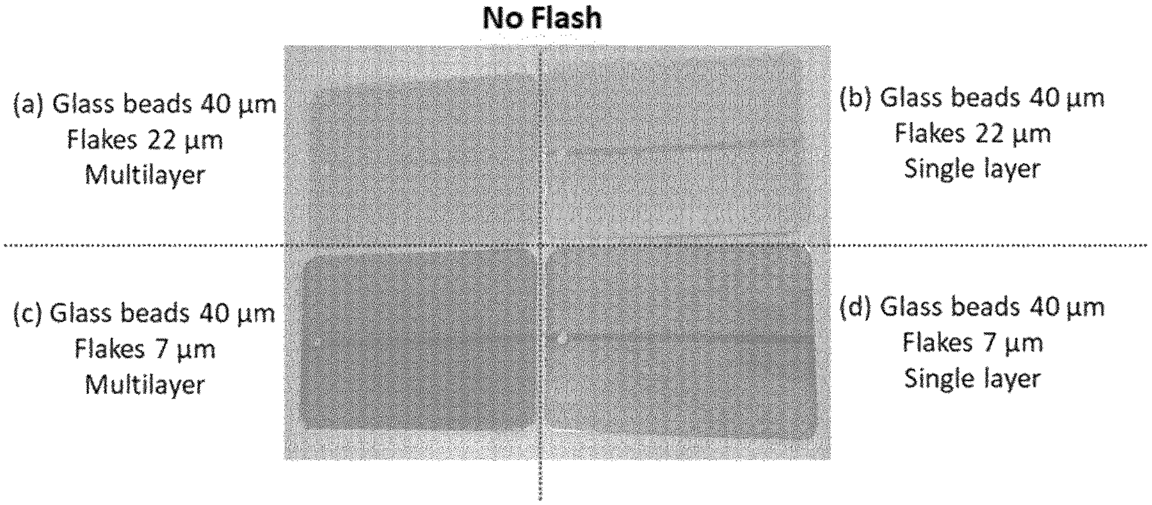
FIG. 1 shows the coverage of retroreflective ink, coating or paint compositions under normal lighting conditions.

In a first aspect, the invention concerns a retroreflective ink, coating or paint composition consisting, based on the total weight of the composition, of:

15-75 wt. % of solvent;

1-85 wt. % of spherical glass beads having a median particle diameter D50, as measured with laser diffraction, between 1 and 150 μm, and a refractive index, measured at a wavelength λ of 589 nm, between 1.5 and 2.8;

0.05-2.5 wt. % of one or more thickeners; and 0.20-4.5 wt. % of synthetic pigment flakes having an average diameter of between 1 and 75 μm, a thickness smaller than 1 μm and an aspect ratio (flake diameter/thickness) of at least 10, wherein said synthetic pigment flakes are chosen from (A), (B), (C) or a combination thereof:

(A) Metal flakes or synthetic mica flakes, optionally coated with at least one layer of one or more components chosen from the group consisting of metal oxides, metals, metal sulphides, titanium suboxides, titanium oxynitrides, FeO(OH), $SiO_2$, $B_2O_3$, $GeO_2$, $MgF_2$, metal alloys, rare earth compounds, and optionally coated with an outer layer comprising one or more colourants and a binder;

(B) Flakes comprising $Al_2O_3$, $SiO_2$, glass, ceramic, graphite or mica platelets coated with at least one layer of one or more components chosen from the group consisting of metal oxides, metals, metal sulphides, titanium suboxides, titanium oxynitrides, FeO(OH), $SiO_2$, $B_2O_3$, $GeO_2$, metal alloys, rare earth compounds, and optionally coated with an outer layer comprising one or more colourants and a binder;

(C) Flakes comprising $Al_2O_3$ platelets doped with one or more components chosen from the group consisting of $TiO_2$, $ZrO_2$, $SiO_2$, $SnO_2$, $In_2O_3$, ZnO and iron oxide, coated with at least one layer of one or more components chosen from the group consisting of metal oxides, metals, metal sulphides, titanium suboxides, titanium oxynitrides, FeO(OH), $SiO_2$, $B_2O_3$, $GeO_2$, metal alloys, rare earth compounds, and optionally coated with an outer layer comprising one or more colourants and a binder;

0-2 wt. % of one or more pigment flakes or particles (D) other than synthetic pigment flakes (A), (B) and (C);

0-30 wt. % of one or more further ingredients, wherein the combined amount of the synthetic pigment flakes (A), (B) and (C) and the one or more pigments flakes or particles (D) is between 0.20 and 4.5 wt. %, preferably between 0.20 and 4.0 wt. %.

In a very preferred embodiment, the first aspect concerns a retroreflective ink, coating or paint composition consisting, based on the total weight of the composition, of:

15-68 wt. % of solvent;

10-50 wt. % of spherical glass beads having a median particle diameter D50, as measured with laser diffraction, between 5 and 150 μm, and a refractive index, measured at a wavelength λ of 589 nm, between 1.5 and 2.8;

0.05-2.5 wt. % of one or more thickeners; and 0.20-4.5 wt. % of synthetic pigment flakes having an average diameter of between 5 and 50 μm, a thickness smaller than 1 μm and an aspect ratio (flake diameter/thickness) of at least 10, wherein said synthetic pigment flakes are chosen from (A), (B), (C) or a combination thereof:

(A) Metal flakes or synthetic mica flakes, optionally coated with at least one layer of one or more components chosen from the group consisting of metal oxides, metals, metal sulphides, titanium suboxides, titanium oxynitrides, FeO(OH), $SiO_2$, $B_2O_3$, $GeO_2$, $MgF_2$, metal alloys, rare earth compounds, and optionally coated with an outer layer comprising one or more colourants and a binder;

(B) Flakes comprising $Al_2O_3$, $SiO_2$, glass, ceramic, graphite or mica platelets coated with at least one layer of one or more components chosen from the group consisting of metal oxides, metals, metal sulphides, titanium suboxides, titanium oxynitrides, FeO(OH), $SiO_2$, $B_2O_3$, $GeO_2$, metal alloys, rare earth compounds, and optionally coated with an outer layer comprising one or more colourants and a binder;

(C) Flakes comprising $Al_2O_3$ platelets doped with one or more components chosen from the group consisting of $TiO_2$, $ZrO_2$, $SiO_2$, $SnO_2$, $In_2O_3$, ZnO and iron oxide, coated with at least one layer of one or more components chosen from the group consisting of metal oxides, metals, metal sulphides, titanium suboxides, titanium oxynitrides, FeO(OH), $SiO_2$, $B_2O_3$, $GeO_2$, metal alloys, rare earth compounds, and optionally coated with an outer layer comprising one or more colourants and a binder;

0-2 wt. % of one or more pigment flakes or particles (D) other than synthetic pigment flakes (A), (B) and (C);

0-30 wt. % of one or more further ingredients, wherein the combined amount of the synthetic pigment flakes (A), (B) and (C) and the one or more pigments flakes or particles (D) is between 0.20 and 4.5 wt. %, preferably between 0.20 and 4.0 wt. %.

In preferred embodiments, the retroreflective ink, coating or paint composition is stable for at least 1 day, more preferably at least 2 days, at least 5 days, at least 10 days, at least 1 month, at least 2 months, at least 6 months, at least 1 year, at least 2 years, wherein the composition is considered stable if upon visual and tactile inspection no sedimentation, no syneresis and no separation can be observed. In preferred embodiments, the retroreflective ink, coating or paint composition is spray-stable for at least 24 hours. A composition is considered spray-stable if it can be sprayed without remixing.

Solvent

In an embodiment, the solvent is an aqueous solvent or water. The term 'aqueous solvent' as used herein concerns a solvent that comprises at least 70 wt. % of water based on the weight of the aqueous solvent, preferably at least 80 wt. % of water, more preferably at least 90 wt. % of water, even more preferably at least 95 wt. % of water, such as at least 96 wt. %, at least 97 wt. % and at least 98 wt. % The remaining solvents in the aqueous solvent are not particularly limited, but are typically water-miscible organic solvents, such as an alcohol (for example, methanol, ethanol, propanol, isopropanol, butanol, isobutanol, sec-butanol, t-butanol, pentanol, hexanol, cyclohexanol), a polyhydric alcohol (for example, ethylene glycol, diethylene glycol, triethylene glycol, polyethylene glycol, propylene glycol, dipropylene glycol, polypropylene glycol, butylene glycol, hexanediol, pentanediol, glycerol, hexanetriol, or thiodiglycol), a glycol derivative such as, e.g., an ether or an ester (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether or ethylene glycol monophenyl ether), an amine (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine or tetramethylpropylenediamine), an amide (for example, formamide, N,N-dimethylformamide, or N,N-dimethylacetamide), dimethylsulfoxide, sulfolane, 2-pyrrolidone, N-methyl-2-pyrrolidone, N-vinyl-2-pyrrolidone, 2-oxazolidone, 1,3-dimethyl-2-imidizolidinone, acetonitrile, acetone and combinations thereof.

In another embodiment, the solvent is an organic solvent or a mixture of organic solvents. Preferred organic solvents are chosen from the group consisting of aliphatic and aromatic solvents, ketones, esters, glycoethers, alcohols, halogenated hydrocarbons, and combinations thereof. Very preferred organic solvent are chosen from the group consisting of xylene (mixture of isomers), toluene, ethylbenzene, naphtha, 1,2,4-trimethylbenzene, mesitylene, n-propylbenzene, isopentyl acetate, n-butyl acetate, (2-methoxymethylethoxy)propanol, 2-butoxyethyl acetate, 2-methylbutyl acetate, isobutanol, 1-butanol, 1-ethoxypropane-2-ol, 2,6-dimethyl-4-heptanone, 2-methoxy-1-methylethylacetate, 4,6-dimethyl-heptane-2-one, 4-methyl-2-pentanone, 1-methoxy-2-propanol, 1-methoxy-2-propylacetate, 2-(2-butoxyethoxy)ethanol, 2-butoxyethanol, 5-methylhexane-2-one, ethyl acetate and combinations thereof.

In a very preferred embodiment, the amount of the solvent is 15-68 wt. %, based on the total weight of the composition.

In embodiments, the amount of the solvent is 20-68 wt. %, 30-68 wt. %, 40-68 wt. %, 50-68 wt. %, or 52-68 wt. %, based on the total weight of the composition.

In other embodiments, the amount of the one or more further ingredients is 25-67 wt. %, 35-66 wt. %, or 45-65 wt. %, based on the total weight of the composition.

In embodiments, the amount of the solvent is 20-75 wt. %, 30-75 wt. %, 40-75 wt. %, 50-75 wt. % or 52-75 wt. %, based on the total weight of the composition.

Spherical Glass Beads

As defined hereinbefore, the refractive index of the spherical glass beads, measured at a wavelength λ of 589 nm, is between 1.5 and 2.8.

In a preferred embodiment, the spherical glass beads have a refractive index, measured at a wavelength λ of 589 nm, of between:

(a) 2.0 and 2.8, preferably between 2.1 and 2.4; or (b) 1.7 and 2.1, preferably between 1.8 and 2.0.

In preferred embodiments, the term 'glass' in 'spherical glass beads' as used herein refers to non-crystalline, amorphous solid and transparent material made of oxides. In other embodiments, the term 'glass' in 'spherical glass beads' refers to solid and transparent material made of oxides and containing some microcrystallinity. The refractive index of the spherical glass beads is closely related to the density of the glass, although the relationship is not linear. Because of the nature of glass, the density is approximately an additive function of its composition. Densities of spherical glass beads having refractive indices between 1.5 and 2.8 typically vary between 2.5 and 4.5 g/$cm^3$.

Oxides that can be used in glass are oxides of silicon, boron, aluminium, sodium, barium, vanadium, titanium, lanthanum, strontium, zirconium, potassium, magnesium, iron, calcium, zinc, lithium, barium and lead. The spherical glass beads can for example comprise different combinations of silica ($SiO_2$), boric oxide ($B_2O_3$), phosphorous pentoxide ($P_2O_5$), vanadium pentoxide ($V_2O_5$), arsenic trioxide ($As_2O_3$), germanium oxide ($GeO_2$), calcium oxide (CaO), sodium oxide ($Na_2O$), magnesium oxide (MgO), zinc oxide (ZnO), aluminium oxide ($Al_2O_3$), potassium oxide ($K_2O$), iron oxide ($Fe_2O_3$), lead oxide (PbO), barium oxide (BaO), barium titanate ($BaTiO_3$), titanium oxide ($TiO_2$), lithium oxide ($Li_2O$), strontium oxide (SrO), lanthanum oxide ($La_2O_3$), and zirconium oxide ($ZrO_2$). Silica and boric oxide are generally the lowest in density. Glasses containing large weight percentages of these oxide therefore generally result in glass beads with low refractive indices. The refractive indices can be increased by adding oxides with higher molecular weights.

Preferably, the spherical glass beads do not comprise PbO.

Glass beads having refractive indices in the range of 1.5-2.51 and their composition in terms of oxides are disclosed in WO2014/109564A1, which is incorporated herein by reference in its entirety. PbO-free transparent glass beads with refractive indices of above 2.15 are disclosed in U.S. Pat. No. 4,082,427, which is incorporated herein by reference in its entirety.

The spherical glass beads may be coloured spherical glass beads as long as they remain transparent. Both coloured spherical glass beads made from coloured transparent glass and spherical glass beads provided with a concentric transparent coloured coating are encompassed by the invention. The colour may be the natural colour caused by the composition of the oxides or may be deliberately chosen by adding ingredients having a specific colour. Coloured glass beads having high refractive indices and high transparency are disclosed in WO2014/109564A1.

Accordingly, in an embodiment, at least part of the spherical glass beads are spherical glass beads made from coloured transparent glass and/or at least part of the spherical glass beads is provided with a concentric transparent coloured coating.

The spherical glass beads have a median particle diameter D50, as measured with laser diffraction. Accordingly, the median particle diameter D50 is a volume median, based on a volume distribution. The median particle diameter D50 is the diameter where half of the population of spherical glass beads lies below. This volume median particle diameter is often referred to in the art as Dv50 or $D_{v0.5}$.

In a very preferred embodiment, the spherical glass beads have a median particle diameter D50, as measured with laser diffraction, between 5 and 150 μm.

In an embodiment, the spherical glass beads have a median particle diameter D50, as measured with laser diffraction, between 25 and 100 μm, preferably between 30 and 75 μm, more preferably between 35 and 50 μm.

In a preferred embodiment, the spherical glass beads have a median particle diameter D50, as measured with laser diffraction, between 5 and 100 μm, such as between 5 and 75 μm, between 5 and 50 μm, between 5 and 45 μm, between 5 and 40 μm or between 5 and 35 μm.

In a very preferred embodiment, the spherical glass beads have a median particle diameter D50, as measured with laser diffraction, between 1 and 100 μm, such as between 1 and 75 μm, between 1 and 50 μm, between 1 and 45 μm, between 1 and 40 μm, between 1 and 35 μm, between 1 and 30 μm, between 1 and 25 μm, between 1 and 20 μm, between 1 and 15 μm or between 1 and 10 μm.

In yet another embodiment, the spherical glass beads have a median particle diameter D50, as measured with laser diffraction, between 25 and 150 μm, such as between 50 and 150 μm, between 75 and 150 μm, between 100 and 150 μm, between 110 and 150 μm or between 115 and 150 μm.

The diameters D10 and D90 are often referred to in the art as Dv10 or $D_{v0.1}$ and Dv90 or $D_{v0.9}$, respectively. The D10 diameter is the diameter where 10% of the population of spherical glass beads lies below. Similarly, the D90 diameter is the diameter where 90% of the population of spherical glass beads lies below.

The span, as measured by laser diffraction, of the particle size distribution of the spherical glass beads is defined by:

$$\text{span} = \frac{D90 - D10}{D50}$$

In another embodiment, the spherical glass beads have a median particle diameter D50, as measured with laser diffraction, between 15 and 100 μm and a span between 0 and 1.9, preferably between 0 and 1.5, more preferably between 0 and 1, even more preferably between 0 and 0.5, such as between 0 and 0.2 or between 0 and 0.1.

In a preferred embodiment, the spherical glass beads have a median particle diameter D50, as measured with laser diffraction, between 30 and 75 μm and a span between 0 and 1.9, preferably between 0 and 1.5, more preferably between 0 and 1, even more preferably between 0 and 0.5, such as between 0 and 0.2 or between 0 and 0.1.

In another preferred embodiment, the spherical glass beads have a median particle diameter D50, as measured with laser diffraction, between 15 and 50 μm and a span between 0 and 1.9, preferably between 0 and 1.5, more preferably between 0 and 1, even more preferably between 0 and 0.5, such as between 0 and 0.2 or between 0 and 0.1.

In yet another preferred embodiment, the spherical glass beads have a median particle diameter D50, as measured with laser diffraction, between 5 and 35 μm and a span between 0 and 1.9, preferably between 0 and 1.5, more preferably between 0 and 1, even more preferably between 0 and 0.5, such as between 0 and 0.2 or between 0 and 0.1.

In yet another preferred embodiment, the spherical glass beads have a median particle diameter D50, as measured with laser diffraction, between 1 and 35 μm and a span between 0 and 1.9, preferably between 0 and 1.5, more preferably between 0 and 1, even more preferably between 0 and 0.5, such as between 0 and 0.2 or between 0 and 0.1.

In still another preferred embodiment, the spherical glass beads have a median particle diameter D50, as measured with laser diffraction, between 10 and 25 μm and a span between 0 and 1.9, preferably between 0 and 1.5, more preferably between 0 and 1, even more preferably between 0 and 0.5, such as between 0 and 0.2 or between 0 and 0.1.

In still another preferred embodiment, the spherical glass beads have a median particle diameter D50, as measured with laser diffraction, between 1 and 25 μm and a span between 0 and 1.9, preferably between 0 and 1.5, more preferably between 0 and 1, even more preferably between 0 and 0.5, such as between 0 and 0.2 or between 0 and 0.1.

In still another preferred embodiment, the spherical glass beads have a median particle diameter D50, as measured with laser diffraction, between 1 and 15 μm and a span between 0 and 1.9, preferably between 0 and 1.5, more preferably between 0 and 1, even more preferably between 0 and 0.5, such as between 0 and 0.2 or between 0 and 0.1.

In still another preferred embodiment, the spherical glass beads have a median particle diameter D50, as measured with laser diffraction, between 1 and 10 μm and a span between 0 and 1.9, preferably between 0 and 1.5, more preferably between 0 and 1, even more preferably between 0 and 0.5, such as between 0 and 0.2 or between 0 and 0.1.

As will be appreciated by those skilled in the art, span=0 corresponds to monodisperse spherical glass beads.

In a preferred embodiment, at least part of the spherical glass beads are hemispherically coated with a light-reflective coating, preferably with a hemispherical aluminium coating (HAC). In another embodiment, particularly suitable for composition based on an organic solvent, at least part of the spherical glass beads is fluoro-chemically coated. In another embodiment, particularly suitable for water-based of aqueous compositions, at least part of the spherical glass beads is silane coated. In another embodiment, particularly suitable for water-based of aqueous compositions, at least part of the spherical glass beads is silicone coated.

In a very preferred embodiment, the amount of the spherical glass beads is 10-50 wt. %, based on the total weight of the retroreflective ink, coating or paint composition.

In a preferred embodiment, the amount of the spherical glass beads is 15-50 wt. %, more preferably 20-48 wt. %, even more preferably 25-45 wt. %, based on the total weight of the retroreflective ink, coating or paint composition.

In embodiments, the amount of the spherical glass beads is 20-50 wt. %, 20-49 wt. %, 20-48 wt. %, 20-47 wt. %, 20-46 wt. %, 20-45 wt. % or 20-44 wt. %, based on the total weight of the retroreflective ink, coating or paint composition.

In other embodiments, the amount of the spherical glass beads is 1-80 wt. %, 1-78 wt. %, 1-76 wt. %, 1-74 wt. %, 1-72 wt. %, 1-70 wt. % or 1-68 wt. %, based on the total weight of the retroreflective ink, coating or paint composition.

In other embodiments, the amount spherical glass beads is 22-50 wt. %, 23-50 wt. %, 24-50 wt. %, 25-50 wt. %, 26-50 wt. %, 27-50 wt. %, or 28-50 wt. %, based on the total weight of the retroreflective ink, coating or paint composition.

In other embodiments, the amount spherical glass beads is 2-85 wt. %, 5-85 wt. %, 8-85 wt. %, 10-85 wt. %, 12-85 wt. %, 14-85 wt. % or 16-85 wt. %, based on the total weight of the retroreflective ink, coating or paint composition.

The particular application of the retroreflective ink, coating or paint composition determines the optimum refractive index of the spherical glass beads. If the composition is to be applied in a dry environment or onto a substrate that is to show retroreflectivity under dry conditions and wherein the applied layer of retroreflective spherical glass beads is not coated by a further layer, the refractive index of the spherical glass beads, measured at a wavelength λ of 589 nm, can be between 1.8 and 2.8.

In an embodiment, the retroreflective ink, coating or paint composition as defined herein comprises spherical glass beads having a refractive index, measured at a wavelength λ of 589 nm, between 1.8 and 2.0.

If, on the other hand, the composition is to be applied in a wet environment or onto a substrate that is to show retroreflectivity under wet conditions or the applied layer of retroreflective spherical glass beads is coated by one or more further transparent layers, the refractive index of the spherical glass beads, measured at a wavelength λ of 589 nm, preferably is between 2.0 and 2.8, more preferably between 2.2 and 2.4. Compositions that are to show retroreflectivity under both dry and wet conditions and wherein the applied layer of retroreflective spherical glass beads is coated or is not coated by one or more further transparent layers can comprise different types of glass beads having different refractive indices, and optionally different sizes. In an embodiment, the retroreflective ink, coating or paint composition as defined herein comprises spherical glass beads having a refractive index, measured at a wavelength λ of 589 nm, between 2.0 and 2.8, preferably between 2.2 and 2.4.

In another embodiment, the retroreflective ink, coating or paint composition as defined herein comprises at least two types of spherical glass beads wherein at least one type of spherical glass beads has a refractive index, measured at a wavelength λ of 589 nm, between 1.8 and lower than 2.0 and at least one further type of spherical glass beads has a refractive index, measured at a wavelength λ of 589 nm, between 2.0 and 2.8.

Thickener

The retroreflective ink, coating or paint composition comprises a thickener. Without wishing to be bound by any theory, it is believed that the thickener limits or reduces settling and/or sedimentation of the spherical glass beads and optionally of further particulate matter in the composition such as pigment flakes and particles so that the composition can easily be resuspended. Moreover, again without wishing to be bound by any theory, it is believed that the thickener provides the retroreflective ink, coating or paint composition with shear-thinning behaviour.

In embodiments, the thickener encompasses mixtures of different thickeners. In other embodiments, the thickener consists of a single thickener.

The amount of solvent in the retroreflective ink, coating or paint composition is independently specified. If a thickener is applied in the form of for example a solution, suspension or dispersion in a solvent, the amount of thickener as defined hereinbefore concerns the dry weight of the thickener.

In a preferred embodiment, the amount of the thickener is 0.05-2.3 wt. %, more preferably 0.08-1.5 wt. %, even more preferably 0.09-1.25 wt. %, based on the total weight of the retroreflective ink, coating or paint composition.

In embodiments, the amount of the thickener is 0.05-2.0 wt. %, 0.05-1.5 wt. %, 0.05-1.2 wt. %, 0.05-1.1 wt. %, 0.05-1.0 wt. %, 0.05-0.9 wt. %, 0.05-0.8 wt. %, 0.05-0.7 wt. %, 0.05-0.6 wt. %, or 0.05-0.55 wt. %, based on the total weight of the retroreflective ink, coating or paint composition.

In other embodiments, the amount of the thickener is 0.10-2.5 wt. %, 0.15-2.5 wt. %, 0.20-2.5 wt. %, 0.25-2.5 wt. %, 0.35-2.5 wt. %, 0.45-2.5 wt. %, 0.55-2.5 wt. %, 0.65-2.5 wt. % or 0.75-2.5 wt. %, based on the total weight of the retroreflective ink, coating or paint composition.

As will be appreciated by those skilled in the art, different types of solvents typically require different thickeners. In what follows, preferred thickeners for aqueous compositions will be described and preferred thickeners for compositions based on organic solvents.

Thickeners for Aqueous Systems

One preferred group of thickeners for aqueous compositions are ASE polymers (Alkali Swellable Emulsion; these polymers are produced using emulsion polymerization). ASE polymers are based on a balance of hydrophilic (meth) acrylic acid monomers and hydrophobic (meth)acrylate ester monomers and can be supplied at high volume solids in liquid form. ASE polymers rely on a change from low to high pH (neutralization) to trigger thickening. The 'trigger' is built into the polymer by creating an approximately 50:50 ratio of (meth)acrylic acid, which is soluble in water, and a (meth)acrylate ester, which is not soluble in water. When the acid is un-neutralized (low pH), the polymer is insoluble in water and does not thicken. When the acid is fully neutralized (high pH), the polymer becomes soluble and thickens. ASE polymers are supplied at low pH (<5) and maintain a low as-supplied viscosity (<100 cP) at solids of up to 35%. When subject to a pH of about 7 or higher, ASE polymers solubilize, swell, and thicken the composition through volume exclusion. The degree of thickening can be related to the molecular weight of the polymer. Because their performance depends on water absorption and swelling, ASE polymers tend to be very high in molecular weight, which allows them to thicken efficiently. The rheology profiles ASE polymers create are typically steeply shear-thinning (pseudoplastic), and thus ASE polymers are well suited to build high viscosity at very low shear rates.

In an embodiment, the hydrophilic monomers of the ASE polymer are chosen from the group consisting of (meth) acrylic acid, maleic acid and combinations thereof.

In another embodiment, the hydrophobic monomers of the ASE polymer are chosen from the group consisting of the esters of (meth)acrylic acid with $C_1$- to $C_4$-alcohols, in particular of ethyl acrylate, butyl acrylate, and methyl methacrylate.

In still another preferred embodiment, the hydrophilic monomers of the ASE polymer are chosen from the group consisting of (meth)acrylic acid, maleic acid and combinations thereof and the hydrophobic monomers of the ASE polymer are chosen from the group consisting of the esters of (meth)acrylic acid with $C_1$- to $C_4$-alcohols, in particular ethyl acrylate, butyl acrylate, and methyl methacrylate.

In an embodiment, the ASE polymer is a copolymer consisting of 10-90 wt. %, based on the weight of the ASE polymer, of repeating units based on one or more hydrophilic monomers A and 10-90 wt. % of repeating units based on one or more hydrophobic monomers B, wherein the amounts of the monomers A and B add up to 100 wt. %:

(A)

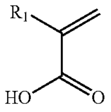

-continued (B)

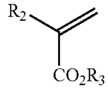

wherein $R_1$ and $R_2$ are independently hydrogen or methyl and wherein $R_3$ is $C_1$- to $C_4$-alkyl.

Another preferred group of thickeners for aqueous compositions are HASE polymers (Hydrophobically-modified Alkali Swellable Emulsion, these polymers are produced using emulsion polymerization). HASE polymers are copolymers that build on the ASE polymer chemistry by adding one or more hydrophobic associative monomers, such as an acrylic ester and/or vinyl ester monomer, to the ASE polymer composition. HASE polymers retain the pH dependent behaviour of their ASE counterparts, but in addition to absorbing water, HASE polymers also thicken via hydrophobic association. This mechanism is known as associative thickening (i.e. associating with any hydrophobic moiety in the composition).

The hydrophilic and hydrophobic monomers of the HASE polymers can be the same as described with respect to the ASE polymers. Preferred hydrophobic associative monomers are (meth)acrylic ester monomers of (meth)acrylic acid and $C_8$-$C_{22}$-alcohols and/or vinyl ester monomers of (substituted) vinyl alcohols and $C_8$-$C_{22}$-alkyl acids. In another preferred embodiment, the one or more hydrophobic associative monomers are selected from the group consisting of steareth-20 methacrylate, beheneth-25 methacrylate, vinyl neodecanoate, and combinations thereof.

In an embodiment, the HASE polymer is a copolymer consisting of 10-90 wt. %, based on the weight of the HASE polymer, of repeating units based on one or more hydrophilic monomers A as defined hereinbefore, 10-90 wt. % of repeating units based on one or more hydrophobic monomers B as defined hereinbefore, and 0.01 to 2 wt. % of repeating units based on one or more hydrophobic associative monomers C and/or D, wherein the amounts of the monomers A, B, C and D add up to 100 wt. %:

(C)

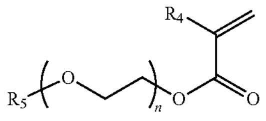

(D)

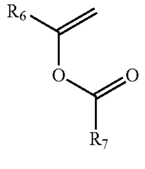

wherein $R_4$ is hydrogen or methyl, wherein $R_5$ is $C_8$- to $C_{22}$-alkyl, wherein n is an integer from 0 to 50, wherein $R_6$ is hydrogen or methyl and wherein $R_7$ is $C_8$- to $C_{22}$-alkyl.

Yet another preferred group of thickeners for aqueous compositions are Hydrophobically-modified Ethoxylated URethane (HEUR) polymers. Unlike ASE or HASE-type thickeners, HEUR polymers are non-ionic and soluble at any pH. This solubility is due to the polymer's ethylene oxide backbone, which is water soluble and makes up the majority of the polymer structure. Thus, HEUR polymers require a hydrophobic moiety in the composition to interact with the ethylene oxide backbone to impart structure.

Examples of ASE polymers include Rheovis® 1125 (available from BASF Corporation), ACULYN™ 33; ACULYN™ 38, ACUSOL™ 810A, ACUSOL™ 830, ACUSOL™ 835, ACUSOL™ 842 (all available from DOW Chemical), and Carbopol® Aqua 30 polymer (from Lubrizol Corporation).

Examples of HASE polymers include ACULYN™ Excel, ACRYSOL™ TT615, ACULYN™ 22; ACULYN™ 88, ACUSOL™ 801S, ACUSOL™ 805S, ACUSOL™ 820 and ACUSOL™ 823 (all available from DOW Chemical).

Examples of HEUR polymers include ACUSOL™ 880, ACUSOL™ 882, ACULYN™ 44 and ACULYN™ 46N (all available from DOW Chemical).

In yet another embodiment, the solvent is water or an aqueous solvent and the one or more thickeners are chosen from the group consisting of ASE polymers, HASE polymers, HEUR polymers, liquid acrylic crosslinked or copolymer dispersions, acrylates crosspolymers, crosslinked polyacrylic acid polymers, crosslinked polyacrylic acid copolymers, non-ionic aqueous emulsions of a modified ethylene vinyl acetate copolymer wax, modified urea or urea-modified polyamides, and combinations thereof.

In yet another embodiment, the solvent is water or an aqueous solvent and the one or more thickeners are chosen from the group consisting of acrylates crosspolymers, crosslinked polyacrylic acid polymers and crosslinked polyacrylic acid copolymers, particularly from the Carbopol® Polymer products from Lubrizol Corporation, such as Carbopol® AQUA SF-1 Polymer, Carbopol® AQUA SF-1 OS Polymer and Carbopol® Aqua SF-3 Polymer.

In still another embodiment, the solvent is water or an aqueous solvent and the one or more thickeners are chosen from the group consisting of liquid acrylic crosslinked or copolymer dispersions.

In yet another embodiment, the solvent is water or an aqueous solvent and the one or more thickeners are chosen from the group consisting of non-ionic aqueous emulsions of a modified ethylene vinyl acetate copolymer wax, such as Aquatix 8421, available from BYK.

In yet another embodiment, the solvent is water or an aqueous solvent and the one or more thickeners are chosen from the group consisting of modified urea or urea-modified polyamides, such as Rheobyk-420, available from BYK.

In an embodiment, the solvent is water or an aqueous solvent and the one or more thickeners are chosen from the group consisting of ASE polymers, HASE polymers, HEUR polymers, liquid acrylic crosslinked or copolymer dispersions, acrylates crosspolymers, crosslinked polyacrylic acid polymers, crosslinked polyacrylic acid copolymers, non-ionic aqueous emulsions of a modified ethylene vinyl acetate copolymer wax, modified urea or urea-modified polyamides, and combinations thereof.

In another embodiment, the solvent is water or an aqueous solvent and the one or more thickeners are chosen from the group consisting of ASE polymers, HASE polymers, HEUR polymers, liquid acrylic crosslinked or copolymer dispersions, acrylates crosspolymers, crosslinked polyacrylic acid polymers, crosslinked polyacrylic acid copolymers, non-ionic aqueous emulsions of a modified ethylene vinyl acetate copolymer wax, and combinations thereof.

In another embodiment, the solvent is water or an aqueous solvent and the one or more thickeners are chosen from the group consisting of ASE polymers, HASE polymers, HEUR polymers, liquid acrylic crosslinked or copolymer dispersions, crosslinked polyacrylic acid polymers, crosslinked polyacrylic acid copolymers, and combinations thereof.

In yet another embodiment, the solvent is water or an aqueous solvent and the one or more thickeners are chosen from the group consisting of ASE polymers, HASE polymers, and combinations thereof. In an embodiment, the thickener is selected from the group consisting of ASE polymers, and combinations thereof. In another embodiment, the thickener is selected from the group consisting of HASE polymers, and combinations thereof.

Thickeners for Compositions Based on Organic Solvents

Examples of thickeners that can be used in retroreflective ink, coating or paint compositions based on organic solvents are preferably chosen from the group consisting of (modified) hydrogenated castor oil, clay, modified clay, calcium sulphonate complex, organophilic phyllosilicate, silica-gel, synthetic amorphous silica, acrylic acid type gellants, modified cellulosic materials, polyurea dispersions, solutions of urea-modified polyamides, polyurethane dispersions and combinations thereof. Examples of modified clay includes BENTONE® LT and BENTONE® 38 (Elementis Global). An example of a silica-gel includes HDK® N20 (Wacker Chemical Corporation), or AEROSIL® (Evonik). An example of organophilic phyllosilicate includes Claytone 40 (Byk). An example of a modified hydrogenated castor oil is Efka® RM 1900 (BASF). An example of a hydrogenated castor oil is Efka® RM 1920 (BASF). An example of a solution of a urea-modified non-polar polyamide in isobutanol/monophenyl glycol is Rheobyk-431 (Byk). An example of a solution of a urea-modified polyamide of medium polarity in isobutanol/solvent naphtha is Rheobyk-430 (Byk). An example of synthetic amorphous silica is Zeothix® (Huber).

In a preferred embodiment, two thickeners are used in retroreflective ink, coating or paint composition based on organic solvents, more preferably:

an organophilic phyllosilicate and a modified hydrogenated castor oil; or a calcium sulphonate complex and a polyurea dispersion.

Pigment Flakes and Particles

The retroreflective ink, coating or paint composition comprises synthetic pigment flakes having an average diameter of between 1 and 75 μm, a thickness smaller than 1 μm, and an aspect ratio (flake diameter/thickness) of at least 10, wherein said synthetic pigment flakes are chosen from (A), (B), (C) or a combination thereof:

(A) Metal flakes or synthetic mica flakes, optionally coated with at least one layer of one or more components chosen from the group consisting of metal oxides, metals, metal sulphides, titanium suboxides, titanium oxynitrides, FeO(OH), $SiO_2$, $B_2O_3$, $GeO_2$, $MgF_2$, metal alloys, rare earth compounds, and optionally coated with an outer layer comprising one or more colourants and a binder;

(B) Flakes comprising $Al_2O_3$, $SiO_2$, glass, ceramics, graphite or mica platelets coated with at least one layer of one or more components chosen from the group consisting of metal oxides, metals, metal sulphides, titanium suboxides, titanium oxynitrides, FeO(OH), $SiO_2$, $B_2O_3$, $GeO_2$, metal alloys, rare earth compounds, and optionally coated with an outer layer comprising one or more colourants and a binder;

(C) Flakes comprising $Al_2O_3$ platelets doped with one or more components chosen from the group consisting of $TiO_2$, $ZrO_2$, $SiO_2$, $SnO_2$, $In_2O_3$, ZnO and iron oxide, coated with at least one layer of one or more components chosen from the group consisting of metal oxides, metals, metal sulphides, titanium suboxides, titanium oxynitrides, FeO(OH), $SiO_2$, $B_2O_3$, $GeO_2$, metal alloys, rare earth compounds, and optionally coated with an outer layer comprising one or more colourants and a binder.

In a very preferred embodiment, the retroreflective ink, coating or paint composition comprises synthetic pigment flakes, chosen from (A), (B), (C) or a combination thereof, having an average diameter of between 5 and 50 μm, a thickness smaller than 1 μm, and an aspect ratio (flake diameter/thickness) of at least 10.

The term 'average diameter' in the context of the synthetic pigment flakes refers to the median particle diameter D50.

As will be appreciated by those skilled the art, the term 'synthetic' in 'synthetic pigment flakes' means that the pigment flakes are not pigment flakes naturally occurring, but they are pigment flakes that have been chemically manufactured or naturally occurring pigment flakes that have been chemically/physically processed. One of the advantages of using synthetic pigment flakes is that they can be produced with very smooth surfaces, thereby increasing their reflective properties.

The terms 'flake' or 'platelet' as used herein refers to the shape of pigments having a large surface area and a small thickness. Typically, flakes or platelets are characterized by their 'aspect ratio', being defined as the largest dimension, i.e. the largest diameter of the surface, divided by the smallest dimension, i.e. the thickness. The synthetic pigment flakes as used herein have and aspect ratio of at least 10, preferably at least 15, more preferably at least 20.

In an embodiment, the synthetic pigment flakes as used herein have an aspect ratio of between 10 and 500, preferably between 15 and 250, more preferably between 20 and 100.

In a preferred embodiment, the average diameter of the synthetic pigment flakes is 6-45 μm, more preferably 7-35 μm, even more preferably 8-25 μm, still more preferably 9-20 μm, most preferably 10-16 μm.

In an embodiment, the average diameter of the synthetic pigment flakes is 1.5-65 μm, preferably 2-50 μm, more preferably 2.5-40 μm, still more preferably 3-35 μm, most preferably 4-30 μm.

In another embodiment, the average diameter of the synthetic pigment flakes is 1-65 μm, such as 1-50 μm, 1-40 μm, 1-35 μm, 1-25 μm, 1-20 μm, 1-15 μm or 1-13 μm.

In another embodiment, the average diameter of the pigment flakes is 1.5-75 μm, such as 3-75 μm, 5-75 μm, 7-75 μm, 9-75 μm or 11-75 μm.

In a preferred embodiment, the thickness of the synthetic pigment flakes is between 10 nm and 800 nm, more preferably between 15 nm and 600 nm. In another preferred embodiment, the thickness of the synthetic pigment flakes is between 10 and 200 nm, more preferably between 10 and 150 nm, even more preferably between 10 and 100 nm, still more preferably between 10 and 50 nm. In yet another preferred embodiment, the thickness of the synthetic pigment flakes is between 200 nm and 980 nm, such as between 300 nm and 980 nm, between 400 nm and 980 nm or between 500 nm and 980 nm.

The inventors have found that the retroreflective properties and coverage properties of inks, coatings or paints comprising both pigments and retroreflective spherical glass beads are conflicting in the sense that the amount of pigment typically needed to obtain sufficient coverage diminishes to a large extent or even completely destroys the retroreflective properties.

It is known in the art that applying pigment flakes having a large and smooth surface area to ink, paint or coating formulations typically result in layers with high reflection. On the other hand, adding flakes or particles having an irregular surface area to ink, paint or coating formulations typically result in layers with high coverage. It is, however, difficult to obtain high reflection and high coverage simultaneously. A combination of sufficient reflection and sufficient coverage can typically be obtained with flakes having smooth surfaces (synthetic pigment flakes) and having average (surface) diameters of between 1 and 75 μm, such as between 5 and 50 μm.

The inventors have found that satisfactory retroreflective properties and sufficient coverage properties of ink, coating or paint layers comprising both pigments and retroreflective spherical glass beads can be obtained by applying a specific limited concentration of pigment flakes and pigment particles in the composition and by applying a minimum concentration of synthetic pigment flakes having average (surface) diameters of between 1 and 75 μm, such as between 5 and 50 μm, thicknesses of smaller than 1 μm and aspect ratios of at least 10.

Without wishing to be bound by any theory, the inventors hypothesize that the specific range of average (surface) diameters of between 1 and 75 μm, such as between 5 and 50 μm of the synthetic pigment flakes and their smooth surface area provide sufficient coverage without considerably reducing reflection. Improved coverage implies less retroreflectivity. However, the reflection of the smooth surface area of the synthetic pigment flakes is believed to again improve retroreflectivity. Without wishing to be bound by any theory, the inventors further hypothesize that the very limited thicknesses of the synthetic pigment flakes—in the order of the wavelengths of visible light—further contributes to the retroreflective properties.

As will be appreciated by those skilled in the art, too high a concentration of the combined amount of the synthetic pigment flakes (A), (B) and (C) and the one or more pigments flakes or particles (D) results in reduced retroreflectivity. On the other hand, too low a concentration of the combined amount of the synthetic pigment flakes (A), (B) and (C) and the one or more pigments flakes or particles (D) may result in reduced coverage. However, reduced coverage due to a low concentration of the combined amount of the synthetic pigment flakes (A), (B) and (C) and the one or more pigments flakes or particles (D) can be compensated for by applying a thicker layer to the substrate.

Accordingly, the combined amount of the synthetic pigment flakes (A), (B) and (C) and the one or more pigments flakes or particles (D) is between 0.20 and 4.5 wt. %, preferably between 0.20 and 4.0 wt. %, more preferably between 0.20 and 3.5 wt. %, even more preferably between 0.20-3.0 wt. %, still more between preferably 0.20-2.5 wt. %, yet more preferably between 0.20-2.0 wt. %, based on the total weight of the retroreflective ink, coating or paint composition.

In a preferred embodiment the amount of the one or more pigment flakes or particles (D) other than synthetic pigment flakes (A), (B) and (C) is between 0 and 1.5 wt. %, more preferably between 0 and 1.25 wt. %, such as between 0 and 1 wt. %, between 0 and 0.75 wt. % or between 0 and 0.5 wt. %, based on the total weight of the retroreflective ink, coating or paint composition.

In a preferred embodiment the amount, the combined amount of the synthetic pigment flakes (A), (B) and (C) is between 0.20 and 4.0 wt. %, more preferably between 0.20 and 3.5 wt. %, still more preferably between 0.20 and 3.0 wt. %, even more preferably between 0.20 and 2.5 wt. %, yet more preferably between 0.20-2.0 wt. %, based on the total weight of the retroreflective ink, coating or paint composition.

In a preferred embodiment, the average diameter of the synthetic pigment flakes is greater than 30% of the median particle diameter D50 of the spherical glass beads, more preferably greater than 33%, such as greater than 35, greater than 40, greater than 50%, greater than 55%, greater than 60%, greater than 70%, greater than 90%, greater than 110% or greater than 130%.

In another preferred embodiment, the average diameter of the synthetic pigment flakes is between 30 and 400% of the median particle diameter D50 of the spherical glass beads, more preferably between 40 and 400%, such as between 45 and 400%, between 50 and 400%, between 55 and 400%, between 60 and 400%, between 70 and 400%, between 90 and 400%, between 110 and 400% or between 130 and 400%.

In yet another preferred embodiment, the average diameter of the synthetic pigment flakes is between 30 and 350% of the median particle diameter D50 of the spherical glass beads, more preferably between 30 and 300%, such as between 30 and 250%, between 30 and 225%, between 30 and 200%, between 30 and 175%, between 30 and 150%, between 30 and 125%, between 30 and 100% or between 30 and 75%.

Examples of Flakes (A)

Flakes (A) can have zero to multiple coating layers, such as 1, 2, 3, 4 or 5 coating layers.

In an embodiment, the metal in the metal flakes (A) is chosen from the group consisting of aluminium, silver and gold, preferably aluminium. In a preferred embodiment, metal flakes (A) are aluminium flakes without any coating. Examples of suitable aluminium flakes (A) without any coating include Decomet® aluminium flakes (Schlenk, Germany). Decomet® aluminium flakes typically have a mean particle size ($D_{50}$) of between 10 and 15 μm and a thickness of <50 nm.

In an embodiment, flakes (A) are synthetic mica flakes without any coating.

In an embodiment, pigment flakes (A) are mica flakes with several coating layers, such as mica flakes coated with $TiO_2$, $Fe_2O_3$ and $SnO_2$. Examples include Iriodin® Silver-Grey SW pigment flakes (Merck, Germany).

In an embodiment, metal flakes (A) are aluminium flakes coated with at least one layer of one or more components chosen from the group consisting of metal oxides, $SiO_2$, $B_2O_3$, and $GeO_2$. In an embodiment, metal flakes (A) are aluminium flakes coated with an $SiO_2$ layer.

Examples of suitable aluminium flakes (A) coated with an $SiO_2$ layer are Aquamet® aluminium flakes (Schlenk, Germany). Aquamet® aluminium flakes typically have a mean particle size of between 5 and 50 μm and a thickness of between 20 nm and 1 μm.

Examples of suitable aluminium flakes (A) coated with $MgF_2$ are SpectraFlair pigments (VIAVI Solutions Inc., USA), typically having a mean particle size ($D_{50}$) of between 14 and 35 μm and a thickness of between 250 nm and 900 nm.

In an embodiment, flakes (A) are coated with an $SiO_2$ layer and with an outer layer comprising one or more colourants and a binder for fixation of the one or more colourants. Examples of suitable aluminium flakes (A) coated with an $SiO_2$ layer and with an outer layer comprising one or more colourants and a binder are Toyal flakes (Toyo Aluminium K.K., Japan). Toyal flakes may have a mean particle size of about 10 μm and a thickness of less than 1 μm, such as about 100 nm.

Examples of metal oxides that can be applied in a coating layer on metal flakes (A) are chosen from the group consisting of $TiO_2$, $ZrO_2$, $SnO_2$, ZnO, $MnO_2$, MgO, $Ce_2O_3$, $Fe_2O_3$, $Fe_3O_4$, $FeTiO_5$, $Cr_2O_3$, CoO, $CO_3O_4$, $VO_2$, $V_2O_3$, NiO and combinations thereof.

Examples of suitable aluminium flakes (A) coated with (i) a first layer consisting of $SiO_2$, $B_2O_3$, $MnO_2$, MgO, $GeO_2$ or $Al_2O_3$, (ii) a second $Fe_2O_3$ layer on top of the first layer and optionally (iii) a third layer of $TiO_2$, $ZrO_2$, or $Al_2O_3$ on top of the second layer are disclosed in US2019/044679A1, which is incorporated herein by reference in its entirety.

Examples of Flakes (B) and (C)

Flakes (B) and (C) can have one to multiple coating layers, such as 2, 3, 4 or 5 coating layers.

Examples of metal oxides that can be applied in a coating layer on metal flakes (A) are chosen from the group consisting of $TiO_2$, $ZrO_2$, $SnO_2$, ZnO, $MnO_2$, MgO, $Ce_2O_3$, $Fe_2O_3$, $Fe_3O_4$, $FeTiO_5$, $Cr_2O_3$, CoO, $CO_3O_4$, $VO_2$, $V_2O_3$, NiO and combinations thereof.

In an embodiment, flakes (B) comprise glass platelets, wherein the glass is borosilicate glass.

In an very preferred embodiment, flakes (B) comprise $Al_2O_3$ platelets.

In an embodiment, flakes (B) or (C) are coated with one or more layers of metal oxide, such as with at least one layer of metal oxide chosen from the group consisting of $TiO_2$, $ZrO_2$, $SnO_2$, ZnO, $MnO_2$, MgO, $Ce_2O_3$, $Fe_2O_3$, $Fe_3O_4$, $FeTiO_5$, $Cr_2O_3$, CoO, $CO_3O_4$, $VO_2$, $V_2O_3$, NiO and combinations thereof. In preferred embodiments, flakes (B) or (C) are coated with one or more layers of metal oxide chosen from the group consisting of $TiO_2$, $Fe_2O_3$, $Fe_3O_4$, $SnO_2$, $ZrO_2$, $Cr_2O_3$ and combinations thereof, such as coated with one layer of metal oxide chosen from the group consisting of $TiO_2$, $Fe_2O_3$ and a combination thereof.

Examples of flakes (B) comprising $Al_2O_3$ platelets coated with different layers of metal oxide, $SiO_2$ and an organic dye as a top coat are disclosed in EP2799398B1, which is incorporated herein by reference in its entirety.

Examples of flakes (B) comprising $Al_2O_3$ platelets coated with metal oxide chosen from the group consisting of $TiO_2$, $Fe_2O_3$ and a combination thereof, and their preparation are disclosed in U.S. Pat. No. 6,267,810B1, which is incorporated herein by reference in its entirety.

Examples of flakes (B) comprising $Al_2O_3$ platelets coated with a $TiO_2$ layer or a $Fe_2O_3$ layer are the Xirallic® pigments (Merck, Germany). Xirallic® pigments typically have a mean particle size of between 5 and 50 μm and a thickness of up to 1 μm.

In another embodiment, Flakes (B) or (C) are coated with a layer of titanium suboxides ($Ti_nO_{2n-1}$, with n being an integer greater than 1, such as the oxides $Ti_3O_5$, $Ti_2O_3$), with a layer of titanium oxynitrides, with a layer of FeO(OH), or with a thin semitransparent metal layer, for example comprising Al, Fe, Cr, Ag, Au, Pt or Pd, or combinations thereof.

In yet another embodiment, Flakes (B) or (C) are coated with a layer of a metal sulfide, such as coated with sulfides of tungsten, molybdenum, cerium, lanthanum or rare earth elements.

In another embodiment, Flakes (B) or (C) are coated with an outer layer of one or more colourants, for example Prussian Blue or Carmine Red, and a binder for fixation of the colourant.

As will be appreciated by those skilled in the art, these different layers can be combined, provided that the layer of one or more colourants and a binder is, if present, always an outer layer.

Examples of flakes (C) comprising platelets of $Al_2O_3$ doped with titanium oxide and coated with metal oxide and their manufacture are disclosed in EP0763573B1, which is incorporated herein by reference in its entirety.

Examples of flakes (C) comprising platelets of $Al_2O_3$ doped $TiO_2$, $ZrO_2$, $SiO_2$, $SnO_2$, $In_2O_3$ or ZnO and coated with metal oxide are disclosed in EP2799398B1, which is incorporated herein by reference in its entirety.

Further Ingredients

As described hereinbefore, the retroreflective ink, coating or paint composition comprises 0-30 wt. % of one or more further ingredients. As will be appreciated by the skilled person, the 'further' ingredients are different from the other ingredients defined in the retroreflective ink, coating or paint composition. In other words, the further ingredients do not comprise spherical glass beads, thickeners, solvents, pigment flakes or particles (D), and synthetic pigment flakes (A), (B) and (C).

In a preferred embodiment, the one or more further ingredients are chosen from the group consisting of foam control agents, luminescent agents, UV-absorbers, binders and resins, preservatives, dyes and curing initiators.

Suitable binders and resins for water-based or aqueous compositions and for compositions based on organic solvents are generally known to the skilled person. The binder or resin can be a radiation-curable. If the binder or resin is radiation curable, the further ingredients can comprise a curing initiator, such as a photoinitiator or a thermal initiator.

In embodiments, the amount of the one or more further ingredients is 0-25 wt. %, 0-20 wt. %, 0-15 wt. %, 0-12 wt. %, 0-10 wt. %, 0-8 wt. %, 0-6 wt. %, or 0-5 wt. %, based on the total weight of the retroreflective ink, coating or paint composition.

In other embodiments, the amount of the one or more further ingredients is 0.1-20 wt. %, 0.5-15 wt. %, 1-12 wt. %, 1.5-10 wt. %, 2-8 wt. %, or 2.5-6 wt. %, based on the total weight of the retroreflective ink, coating or paint composition.

The amount of solvent in the retroreflective ink, coating or paint composition is independently specified. If one or more further ingredients is/are applied in the form or for example a solution, suspension or dispersion in a solvent, the amount of the one or more further ingredients defined hereinbefore concerns the dry weight, i.e. the weight without the solvent, of the of the one or more further ingredients.

Rheological Behaviour

The retroreflective ink, coating or paint compositions exhibit shear-thinning behaviour. This means that the viscosity of the compositions decreases when the static/stable situation is perturbed by subjecting it to a certain increased shear rate. The viscosities as defined herein are measured with a Brookfield viscometer using a #5 spindle rotating at 10 rpm at a temperature of 25° C. or with a Brookfield viscometer using a #3 spindle rotating at 0.5 and 20 rpm at a temperature of 25° C.

In a preferred embodiment, the retroreflective ink, coating or paint composition has a viscosity as determined with a Brookfield viscometer using a #5 spindle rotating at 10 rpm at a temperature of 25° C., of between 150 and 5000 mPa·s, more preferably between 200 and 2500 mPa·s, even more preferably between 220 and 1500 mPa·s, such as between 500 and 1000 mPa·s, or between 220 and 750 mPa·s.

In another preferred embodiment, the retroreflective ink, coating or paint composition has a first viscosity $\eta_1$ as determined with a Brookfield viscometer using a #3 spindle rotating at 0.5 rpm at a temperature of 25° C. of between 500 and 8000 mPa·s and a second viscosity $\eta_2$ as determined with a Brookfield viscometer using a #3 spindle rotating at 20 rpm at a temperature of 25° C. that is at least 3 times lower than the first viscosity and that is between 150 and 1000 mPa·s.

In another preferred embodiment, the retroreflective ink, coating or paint composition has a first viscosity $\eta_1$ as determined with a Brookfield viscometer using a #3 spindle rotating at 0.5 rpm at a temperature of 25° C. of between 500 and 8000 mPa·s and a second viscosity $\eta_2$ as determined with a Brookfield viscometer using a #3 spindle rotating at 20 rpm at a temperature of 25° C. that is at least 3 times lower than the first viscosity and that is between 150 and 600 mPa·s.

In still another embodiment, the retroreflective ink, coating or paint composition has a first viscosity $\eta_1$ as determined with a Brookfield viscometer using a #3 spindle rotating at 0.5 rpm at a temperature of 25° C. of between 2000 and 8000 mPa·s and a second viscosity $\eta_2$ as determined with a Brookfield viscometer using a #3 spindle rotating at 20 rpm at a temperature of 25° C. that is at least 4 times lower than the first viscosity and that is between 350 and 600 mPa·s.

Process for the Preparation of the Retroreflective Ink, Coating- or Paint Composition Generally speaking, the ingredients of the retroreflective ink, coating or paint composition can be added in any order. It is however preferred to add the one or more thickeners at the end of the process, at least after adding the spherical glass beads to the solvent, since homogeneously distributing the ingredients is more difficult in a thickened composition.

In a preferred embodiment, the thickener is added after mixing solvent and spherical glass beads. In another preferred embodiment, the thickener is added after mixing solvent, spherical glass beads, the synthetic pigment flakes (A), (B), (C) or a combination thereof, the one or more optional pigment flakes or particles (D), and any further ingredients. Stirring or homogenization is preferably performed at low shear rates to avoid the inclusion of air bubbles in the retroreflective ink, coating or paint composition.

Process for the Preparation of Aqueous or Water-Based Retroreflective Ink, Coating or Paint Compositions As explained hereinbefore, the thickening effect of the thickener in aqueous or water-based compositions may depend on the value of the pH. Accordingly, the process for the preparation of the aqueous or water-based retroreflective ink, coating or paint composition may comprise a step of adjusting the pH, for example adjusting the pH to a value between 6.0 and 11, such as between 7.0 and 11, between 7.0 and 9.5 or between 7.4 and 7.9. The pH can suitably be adjusted using diluted NaOH or aminomethyl propanol neutralizers, such as AMP Ultra® PC 2000.

Accordingly, in an embodiment, a process is provided for the preparation of a retroreflective ink, coating or paint composition as defined herein, wherein the solvent is water or an aqueous solvent, said process comprising the steps of:

(i) adding water or the aqueous solvent, the spherical glass beads as defined hereinbefore, the synthetic pigment flakes (A), (B), (C) or a combination thereof as defined hereinbefore, the one or more optional pigment flakes or particles (D) as defined hereinbefore, the one or more thickeners as defined hereinbefore and the optional one or more further ingredients as defined hereinbefore, to a container;
(ii) stirring or homogenizing the mixture obtained in step (i), preferably at a temperature between 15 and 30° C., preferably for a period of between 5 and 15 minutes; and
(iii) optionally adjusting the pH prior to or after step (ii), preferably to a value between 6.0 and 11, more preferably to a value between 7.0 and 11, such as to a value between 7.0 and 9.5.

Adding the different ingredients can however also be performed at different stages of the process. Consequently, in an embodiment, a process is provided for the preparation of a retroreflective ink, coating or paint composition as defined herein, wherein the solvent is water or an aqueous solvent, said process comprising the steps of (i) adding water or the aqueous solvent, the spherical glass beads as defined hereinbefore, at least part of the one or more thickeners as defined hereinbefore, and optionally part of the one or more further ingredients as defined hereinbefore, optionally part of the synthetic pigment flakes (A), (B), (C) or a combination thereof as defined hereinbefore, and optionally part of the one or more optional pigment flakes or particles (D) as defined hereinbefore, to a container;
(ii) stirring or homogenizing the mixture obtained in step (i), preferably at a temperature between 15 and 30° C., preferably for a period of between 5 and 15 minutes;
(iii) optionally adjusting the pH prior to or after step (ii), preferably to a value between 6.0 and 11, more preferably to a value between 7.0 and 11, such as to a value between 7.0 and 9.5;
(iv) adding at least part of the one or more further ingredients as defined hereinbefore, at least part of the synthetic pigment flakes (A), (B), (C) or a combination thereof as defined hereinbefore, and at least part of the one or more optional pigment flakes or particles (D) as defined hereinbefore to the composition obtained in step (ii) or (iii), optionally adding part of the one or more thickeners as defined hereinbefore and optionally adding water or aqueous solvent;
(v) stirring or homogenizing the mixture obtained in step (iv), preferably at a temperature between 15 and 30° C., preferably for a period of between 5 and 15 minutes; and
(vi) optionally adjusting the pH prior to or after step (v), preferably to a value between 6.0 and 11, more preferably to a value between 7.0 and 11, such as to a value between 7.0 and 9.5.

In embodiments, the time between performing steps (i) to (iii) on the one hand and steps (iv) to (vi) on the other hand may be days or months or even longer.

The process for the preparation of the aqueous or water-based retroreflective ink, coating or paint composition may also encompass the production of an intermediate aqueous or water-based retroreflective ink, coating or paint composition having the composition and properties as defined hereinbefore, followed by adding and admixing another composition to obtain a final aqueous or water-based retroreflective ink, coating or paint composition, with the proviso that the final aqueous or water-based retroreflective ink, coating or paint composition still has a composition and the properties as defined hereinbefore.

Consequently, in an embodiment, a process is provided for the preparation of a retroreflective ink, coating or paint composition as defined herein, wherein the solvent is water or an aqueous solvent, said process comprising the steps of (i) adding water or the aqueous solvent, the spherical glass beads as defined hereinbefore, at least part of the one or more thickeners as defined hereinbefore and optionally part of the one or more further ingredients as defined hereinbefore, optionally part of the synthetic pigment flakes (A), (B), (C) or a combination thereof as defined hereinbefore, and optionally part of the one or more optional pigment flakes or particles (D) as defined hereinbefore, to a container;

(ii) stirring or homogenizing the mixture obtained in step (i), preferably at a temperature between 15 and 30° C., preferably for a period of between 5 and 15 minutes to obtain an intermediate retroreflective ink, coating or paint composition having the composition and properties of the retroreflective ink, coating or paint composition as defined hereinbefore;

(iii) optionally adjusting the pH prior to or after step (ii), preferably to a value between 6.0 and 11, more preferably to a value between 7.0 and 11, such as to a value between 7.0 and 9.5;

(iv) adding at least part of the one or more further ingredients as defined hereinbefore, at least part of the synthetic pigment flakes (A), (B), (C) or a combination thereof as defined hereinbefore, and at least part of the one or more optional pigment flakes or particles (D) as defined hereinbefore to the intermediate retroreflective ink, coating or paint composition obtained in step (ii) or (iii), optionally adding part of the thickener as defined hereinbefore and optionally adding water or aqueous solvent;

(v) stirring or homogenizing the mixture obtained in step (iv), preferably at a temperature between 15 and 30° C., preferably for a period of between 5 and 15 minutes to obtain the retroreflective ink, coating or paint composition; and (vi) optionally adjusting the pH prior to or after step (v), preferably to a value between 6.0 and 11, more preferably to a value between 7.0 and 11, such as to a value between 7.0 and 9.5.

In embodiments, the time between performing steps (i) to (iii) on the one hand and steps (iv) to (vi) on the other hand may be days or months or even longer.

Process for the Preparation of Retroreflective Ink, Coating or Paint Compositions Based on an Organic Solvent In an embodiment, a process is provided for the preparation of a retroreflective ink, coating or paint composition as defined herein, wherein the solvent is an organic solvent, said process comprising the steps of:

(i) adding the organic solvent, the spherical glass beads as defined hereinbefore, the synthetic pigment flakes (A), (B), (C) or a combination thereof as defined hereinbefore, the one or more optional pigment flakes or particles (D) as defined hereinbefore, the one or more thickeners as defined hereinbefore and the optional one or more further ingredients as defined hereinbefore, to a container; and (ii) stirring or homogenizing the mixture obtained in step (i), preferably at a temperature between 15 and 70° C., preferably for a period of between 5 and 15 minutes.

Step (ii) in this embodiment, is more preferably performed at a temperature of between 45 and 65° C.

Adding the different ingredients can however also be performed at different stages of the process. Consequently, in an embodiment, a process is provided for the preparation of a retroreflective ink, coating or paint composition as defined herein, wherein the solvent is an organic solvent, said process comprising the steps of:

(i) adding the organic solvent, the spherical glass beads as defined hereinbefore, at least part of the one or more thickeners as defined hereinbefore, and optionally part of the one or more further ingredients as defined hereinbefore, optionally part of the synthetic pigment flakes (A), (B), (C) or a combination thereof as defined hereinbefore, and optionally part of the one or more optional pigment flakes or particles (D) as defined hereinbefore, to a container;

(ii) stirring or homogenizing the mixture obtained in step (i), preferably at a temperature between 15 and 70° C., preferably for a period of between 5 and 15 minutes;

(iii) adding at least part of the one or more further ingredients as defined hereinbefore, at least part of the synthetic pigment flakes (A), (B), (C) or a combination thereof as defined hereinbefore, and at least part of the one or more optional pigment flakes or particles (D) as defined hereinbefore to the composition obtained in step (ii) or (iii), optionally adding part of the one or more thickeners as defined hereinbefore and optionally adding organic solvent; and (iv) stirring or homogenizing the mixture obtained in step (iii), preferably at a temperature between 15 and 70° C., preferably for a period of between 5 and 15 minutes.

Steps (ii) and (iv) in this embodiment, are more preferably performed at a temperature of between 45 and 65° C. In embodiments, the time between performing steps (i) and (ii) on the one hand and steps (iii) and (iv) on the other hand may be days or months or even longer.

The process for the preparation of the retroreflective ink, coating or paint composition wherein the solvent is an organic solvent may also encompass the production of an intermediate retroreflective ink, coating or paint composition based on an organic solvent having the composition and properties as defined hereinbefore, followed by adding and admixing another composition to obtain a final retroreflective ink, coating or paint composition based on an organic solvent, with the proviso that the final retroreflective ink, coating or paint composition based on an organic solvent still has a composition and the properties as defined hereinbefore.

Consequently, in an embodiment, a process is provided for the preparation of a retroreflective ink, coating or paint composition as defined herein, wherein the solvent is an organic solvent, said process comprising the steps of:

(i) adding the organic solvent, the spherical glass beads as defined hereinbefore, at least part of the one or more thickeners as defined hereinbefore and optionally part of the one or more further ingredients as defined hereinbefore, optionally part of the synthetic pigment flakes (A), (B), (C) or a combination thereof as defined hereinbefore, and optionally part of the one or more optional pigment flakes or particles (D) as defined hereinbefore, to a container;

(ii) stirring or homogenizing the mixture obtained in step (i), preferably at a temperature between 15 and 70° C., preferably for a period of between 5 and 15 minutes to obtain an intermediate retroreflective ink, coating or paint composition having the composition and properties of the retroreflective ink, coating or paint composition as defined hereinbefore;

(iii) adding at least part of the one or more further ingredients as defined hereinbefore, at least part of the synthetic pigment flakes (A), (B), (C) or a combination thereof as defined hereinbefore, and at least part of the one or more optional pigment flakes or particles (D) as defined hereinbefore to the intermediate retroreflective ink, coating or paint composition obtained in step (ii), optionally adding part of the thickener as defined hereinbefore and optionally adding organic solvent; and (iv) stirring or homogenizing the mixture obtained in step (iii), preferably at a temperature between 15 and 70° C., preferably for a period of between 5 and 15 minutes to obtain the retroreflective ink, coating or paint composition.

Steps (ii) and (iv) in this embodiment, are more preferably performed at a temperature of between 45 and 65° C. In embodiments, the time between performing steps (i) and (ii) on the one hand and steps (iii) and (iv) on the other hand may be days or months or even longer.

Process for Coating a Substrate

In a second aspect, the invention concerns a process for coating a substrate with a retroreflective layer, said process comprising the steps of:

a) providing a substrate;
b) optionally applying a primer layer to the substrate of step (a);
c) optionally, but not preferably, applying a coloured base layer to the substrate of step (a) or to the primer layer of step (b);
d) spraying the retroreflective ink, coating or paint composition as defined hereinbefore onto the substrate of step (a) or onto the layer of step (b) or (c) in an amount to provide between 0.25 and 30 $g/m^2$ of the combined amount of the synthetic pigment flakes (A), (B) and (C) and the one or more pigments flakes or particles (D);
e) drying and curing the substrate coated with the retroreflective layer obtained in step (d); and
f) optionally coating the dried substrate coated with the retroreflective layer obtained in step (e) with one or more further transparent coating layers followed by drying or curing.

In a preferred embodiment, the retroreflective ink, coating or paint composition is sprayed in step (d) in an amount to provide between 0.3 and 25 $g/m^2$, more preferably between 0.4 and 23 $g/m^2$ of the combined amount of the synthetic pigment flakes (A), (B) and (C) and the one or more pigments flakes or particles (D).

In another preferred embodiment, the retroreflective ink, coating or paint composition is sprayed in step (d) in an amount to provide between 1 and 15 $g/m^2$, more preferably between 1 and 8 $g/m^2$ of the combined amount of the synthetic pigment flakes (A), (B) and (C) and the one or more pigments flakes or particles (D).

Step (d) of spraying the retroreflective ink, coating or paint composition can comprise spraying a single layer in one step or multiple layers on top of each other in subsequent spraying steps. The subsequent layers are preferably applied 'wet on wet', meaning that a subsequent layer is applied onto the previous layer from which at least some to practically all solvent is evaporated but which is not (fully) cured. This means that, even when subsequent layers are applied 'wet on wet', an intermediate drying step is applied between applying the subsequent layers.

Intermediate drying of layers based on organic solvents is typically performed at a temperature of between 20 and 30° C. for about 2 to 15 minutes. Intermediate drying of layers based on water or aqueous solvents is typically performed at a temperature of between 50 and 60° C. for about 5-20 minutes.

It is also possible to completely dry and cure a previous layer before applying a subsequent layer. Complete drying and curing of a layer based on organic solvents is typically performed at a temperature of about 60° C. for about 20 minutes. Full drying and curing of a layer based on water or aqueous solvent is typically performed at a temperature of about 60° C. for about 20 minutes or overnight at ambient temperature. It is within the skills of the artisan to choose the appropriate drying conditions.

In an embodiment, step (d) encompasses spraying more than one layer, such as 2, 3, 4 or 5 layers.

In an embodiment, step (d) encompasses n subsequent spraying steps resulting in n layers, and wherein layer x is at least partially applied onto layer x−1, wherein x is an integer between 2 and n, and wherein n is an integer between 2 and 5.

In preferred embodiments, the retroreflective ink, coating or paint composition is applied in step (d) in an amount of 200-800 g per $m^2$ of the substrate, more preferably in an amount of 300-600 g per $m^2$ of the substrate.

In an embodiment step (b) is not performed. In a very preferred embodiment step (c) is not performed.

The geometry of the substrate to be coated is not limited in any sense as long as it can be coated by spraying, i.e. as long as droplets of the retroreflective ink, coating or paint composition can reach the surface of the substrate. In embodiments, the substrate is planar. In other embodiments the substrate is curved. In further embodiments, the substrate comprises planar parts and curved parts.

The inventors have established that the retroreflective ink, coating or paint compositions can be applied, e.g. using industrial high-speed spraying, to various substrates resulting in retroreflective coating layers with excellent print or coating quality, such as homogeneity and retroreflectivity at wide angles. These results can also be obtained when the retroreflective ink, coating or paint composition is applied to the surface of a substrate that is positioned vertically and even if the surface of a substrate is sprayed from below.

If the retroreflective coating layer is provided with one or more further transparent coating layers (i.e. step (f) of the process for coating a substrate as defined hereinbefore is performed), a retroreflective layer with high smoothness and improved cleanability is obtained.

In preferred embodiments, the substrate is chosen from textiles, leather, metal, concrete, rubber, plastics, carbon fibers, and combinations thereof. Textiles as used herein encompass woven or knitted textile fabrics such as cotton, polyesters, nylon, silk, wool, viscose and acrylics.

Irrespective of the type of material the substrate is made of, the substrate can be chosen from the group consisting of clothes, traffic signs, car chassis or coachworks, bicycle frames, roads, pavements and guard rails.

A substrate provided with a retroreflective coating in accordance with the present invention may be provided in step (f) with one or more further transparent coating layers. These one or more further transparent coating layers can serve to protect the retroreflective layer against scuffing and/or against moisture. Moreover, they can be used to provide the substrate coated with the retroreflective layer with a specific matte or shiny/glossy appearance. The one or more further transparent coating layers can be coloured. The one or more further transparent coating layers applied in optional step (f) may comprise liquid coating layers, powder coating layers or combinations thereof, that are subsequently cured or dried.

If one or more further transparent coating layers are to be applied in step (f) on a layer of the retroreflective ink, coating or paint composition based on organic solvents, this layer of the retroreflective ink, coating or paint composition is typically not fully cured. If one or more further transparent coating layers are to be applied in step (f) on a layer of the retroreflective ink, coating or paint composition based on water or aqueous solvent, this layer of the retroreflective ink, coating or paint composition is typically fully cured. It is within the skills of the artisan to choose the appropriate drying conditions.

The spraying in step (c) is preferably performed using curtain coating, a spray gun, a high-speed rotary bell, a high-speed rotating disc or using a spray can with a propellant. In a preferred embodiment spraying is performed without using a propellant.

In a third aspect, the invention concerns substrates coated with a retroreflective layer obtainable by the process as defined hereinbefore. The substrate coated with the retroreflective layer can have a matte or shiny appearance.

In a preferred embodiment, the substrate coated with the retroreflective layer, preferably coated with one or more further transparent coating layers (i.e. step (e) of the process for coating a substrate as defined hereinbefore is performed), shows retroreflection of the retroreflective layer at any angle between 0 and 80°, such as between 0 and 78°, between 0 and 75, between 0 and 70°, between 0 and 65°, between 0 and 60, between 0 and 55°, between 0 and 50°, between 0 and 45° and between 0 and 40°, from the perpendicular of the coated substrate. This retroreflection of the retroreflective layer is determined by directing the beam of a torch to the retroreflective layer, wherein the sightline of the eyes substantially coincides with the beam of the torch, and by visually determining whether retroreflection is observed. The experiment starts at zero angle with the perpendicular of the coated substrate after which the angle is gradually increased until no retroreflection is discerned anymore.

Thus, the invention has been described by reference to certain embodiments discussed above. It will be recognized that these embodiments are susceptible to various modifications and alternative forms well known to those of skill in the art.

Furthermore, for a proper understanding of this document and its claims, it is to be understood that the verb 'to comprise' and its conjugations are used in its non-limiting sense to mean that items following the word are included, but items not specifically mentioned are not excluded. In addition, reference to an element by the indefinite article 'a' or 'an' does not exclude the possibility that more than one of the element is present, unless the context clearly requires that there be one and only one of the elements. The indefinite article 'a' or 'an' thus usually means 'at least one'.

EXAMPLES

Example 1

Six compositions (samples 1-5 and 7) according to the invention and two comparative compositions (samples 6 and 8) were prepared on kg scale. The following ingredients were used.

Spherical Glass Beads:

Micro glass beads (RI 2.2), obtained from Jianxi Sunflex Light Retroreflective Material Co, Ltd., having a refractive index of about 2.2, measured at a wavelength λ of 589 nm, having a median particle diameter D50 of 26.56 μm, a D10 diameter of 19.77 μm and a D90 diameter of 32.41 μm, as measured with laser diffraction, and a specific gravity of about 4.5 g/cm$^3$. These spherical glass beads comprise $TiO_2$, BaO, CaO, $SiO_2$ and ZnO.

Micro glass beads (RI 1.9, HAC), obtained from Jianxi Sunflex Light Retroreflective Material Co, Ltd., hemispherically aluminium coated glass beads having a refractive index of about 1.9, measured at a wavelength λ of 589 nm, having a median particle diameter D50 of 38.22 μm, a D10 diameter of 34.86 μm and a D90 diameter of 43.04 μm, as measured with laser diffraction, and a specific gravity of about 4.2 g/cm$^3$. These spherical glass beads comprise $TiO_2$, BaO, $SiO_2$, CaO and $Al_2O_3$.

Glass Beads C (refractive index 2.2, measured at a wavelength λ of 589 nm) were obtained from Jianxi Sunflex Light Retroreflective Material Co, Ltd. These glass beads have a median particle diameter D50 of 40.4 μm, a D10 diameter of 37.3 μm and a D90 diameter of 44.1 μm, as measured with laser diffraction.

Solvents

- Demi Water
- Solvent part of Cromax XB155, obtained from Cromax, mixture of organic solvents, comprising xylene, toluene, ethylbenzene, isopentyl acetate, n-butyl acetate, isobutanol, 2,6-dimethyl-4-heptanone, 2-methoxy-1-methylethylacetate and 4,6-dimethyl-heptane-2-one Cromax XB383, obtained from Cromax, comprising mixture of organic solvents, such as xylene, ethylbenzene, naphtha, 1,2,4-trimethylbenzeen, mesitylene, n-propylbenzene, isopentyl acetate, n-butyl acetate, 2-methylbutyl acetate and 4-methyl-2-pentanone
- Solvent part of Syrox S900 (binder), obtained from Axalta Coating Systems
- Solvent part of Syrox S941 (thinner), obtained from Axalta Coating Systems Further Ingredients

- AMP Ultra PC 2000, obtained from Angus Chemical Company; neutralizer
- Acticide MBL, obtained from Thor; preservative
- Aquabase Nexa P990-8999, obtained from PPG Industries, water-borne binder
- Binder part of Cromax XB155
- Solids part of Syrox S900 (binder), obtained from Axalta Coating Systems
- Solids part of Syrox S941 (thinner), obtained from Axalta Coating Systems Thickeners

- Efka RM1900, obtained from BASF, modified hydrogenated castor oil, thickener
- Claytone 40, obtained from Rheo, organophilic phyllosilicate, thickener
- ACULYN Excel, obtained from DOW Chemical, HASE thickener Pigment Particles and Flakes

- Decomet® 1050/10 VP/13974, obtained from Schlenk Metallic Pigments GmbH, aluminium flakes, having an average diameter of about 12-15 μm and a thickness of <50 nm
- Toyal EMRS-D710, obtained from TOYO ALUMINIUM K.K., aluminium flakes, having an average diameter of about 10 μm and a thickness of <200 nm
- Aquamet® CP-BG/8500/60 obtained from Schlenk Metallic Pigments GmbH, silica-coated aluminium flakes, having an average diameter of about 16 μm and a thickness of <1 μm
- Xirallic® T61-10 WNT Micro Silver, obtained from Merck KGaA, coated aluminium oxide flakes, having an average diameter of between 8 and 14 μm and a thickness of <1 μm
- Metallic Powder—P06690 Silver, obtained from Deco Colors Holland B.V., aluminium flakes, having an average diameter between 12 and 16 μm Iriodin® 9602 Silver-Grey SW (flakes) was obtained from Merck Performance Materials Germany GmbH. These flakes are coated mica flakes, having an average diameter (D50, laser diffraction) of 22.3 μm, a thickness smaller than 1 μm and an aspect ratio (flake diameter/thickness) of at least 10

Iriodin® 9612 Silver-Grey Fine Satin SW (flakes) was obtained from Merck Performance Materials Germany GmbH. These flakes are coated mica flakes, having an average diameter (D50, laser diffraction) of 7.2 μm, a thickness smaller than 1 μm and an aspect ratio (flake diameter/thickness) of at least 10

Three compositions according to the invention (samples 1-3) based on an organic solvent were prepared by adding ingredients in the following order to a container:

(1) add organic solvent Cromax XB383 at ambient temperature (−20° C.);
(2) add glass beads while mixing at ambient temperature (−20° C.);
(3) add Claytone 40 while mixing at 1400 rpm and continue mixing at 1400 rpm for 10 minutes at ambient temperature (−20° C.);
(4) add Efka RM1900 while mixing at 1800 rpm, start heating to 60° C. and continue mixing at 1800 rpm for 15 minutes;
(5) continue mixing at 1800 rpm and 60° C. for 15 minutes;
(6) cooling the mixture obtained in step (5) to ambient temperature (~20-25° C.); and (7) add Cromax XB155 and pigment flakes while mixing at 1800 rpm and continue mixing at 1800 rpm for 10 minutes.

Three compositions according to the invention (samples 4, 5 and 7) and 2 comparative compositions (samples 6 and 8) based on water as a solvent were prepared by adding ingredients in the following order to a container at ambient temperature (−20° C.):

(1) add demi water;
(2) add Acticide MBL while mixing at 600 rpm and continue mixing at 600 rpm for 10 minutes;
(3) add glass beads while mixing at 800 rpm and continue mixing at 800 rpm for 5 minutes;
(4) add AMP Ultra PC 2000 while mixing at 800 rpm and continue mixing at 800 rpm for 10 minutes to establish a pH of about 10.5;
(5) add ACULYN Excel while mixing at 2400 rpm and continue mixing at 2400 rpm for 10 minutes; and
(6) add Aquabase Nexa P990-8999, pigment flakes and demi water while mixing at 1800 rpm and continue mixing at 1800 rpm for 10 minutes.

The amounts of the different ingredients is listed in Table 1.

TABLE 1

| | Sample | | | | | | | |
|---|---|---|---|---|---|---|---|---|
| Ingredients | 1 [wt. %] | 2 [wt. %] | 3 [wt. %] | 4 [wt. %] | 5 [wt. %] | Comp. 6 [wt. %] | 7 [wt. %] | Comp. 8 [wt. %] |
| Solvents | | | | | | | | |
| Water | | | | 63.6 | 63.4 | 61.9 | 64.9 | 63.1 |
| Cromax XB155/XB383/* | 55.6 | 55.5 | 51.0 | | | | | |
| Subtotal solvents(1) | 55.6 | 55.5 | 51.0 | 63.6 | 63.4 | 61.9 | 64.9 | 63.1 |
| Spherical glass beads | | | | | | | | |
| Glass Beads 2.2 | | 34.7 | 35.9 | 31.3 | 31.0 | 28.8 | 30.5 | 28.3 |
| Glass Beads 1.9 HAC | 34.8 | | | | | | | |
| Subtotal spherical glass beads | 34.8 | 34.7 | 35.9 | 31.3 | 31.0 | 28.8 | 30.5 | 28.3 |
| Pigment flakes and particles | | | | | | | | |
| Decomet 1050/10 VP/13974 | 0.4 | 0.4 | | | | | | |
| Toyal EMRS-D710 | | | | 0.2 | | | | |
| Aquamet CP-BG/8500/60 | | | | | 1.3 | 5.4 | 0.4 | |
| Xirallic T61-10 WNT Micro Silver | | | 3.9 | | | | | |
| PO6690 Silver | | | | | | | | 4.7 |
| Subtotal pigments flakes and particles(2) | 0.4 | 0.4 | 3.9 | 0.2 | 1.3 | 5.4 | 0.4 | 4.7 |
| Further ingredients | | | | | | | | |
| Acticide MBL | | | | 0.04 | 0.04 | 0.04 | 0.04 | 0.04 |
| AMP Ultra PC 2000 | | | | 0.01 | 0.01 | 0.01 | 0.01 | 0.01 |
| Binder Aquabase Nexa P990-8999 | | | | 4.66 | 4.12 | 3.77 | 4.01 | 3.69 |
| Binder Cromax XB155 | 8.22 | 8.21 | 7.89 | | | | | |
| Subtotal further ingredients(3) | 8.22 | 8.21 | 7.89 | 4.72 | 4.18 | 3.82 | 4.07 | 3.74 |
| Thickeners | | | | | | | | |
| Claytone 40 | 0.83 | 1.07 | 1.10 | | | | | |
| EFKA RM1900 | 0.11 | 0.11 | 0.11 | | | | | |
| Aculyn Excel | | | | 0.14 | 0.14 | 0.13 | 0.13 | 0.12 |
| Subtotal thickeners(4) | 0.94 | 1.17 | 1.21 | 0.14 | 0.14 | 0.13 | 0.13 | 0.12 |
| Total composition | 100.00 | 100.00 | 100.00 | 100.00 | 100.00 | 100.00 | 100.00 | 100.00 |

(1)Solvents added as such and solvents from further ingredients, thickener, pigments flakes and particles
(2)The concentration of pigments flakes and particles is based on dry mass. Solvents are listed separately
(3)The concentration of further ingredients is based on dry mass. Solvents are listed separately
(4)The concentration of thickeners is based on dry mass. Solvents are listed separately
*All organic solvents added together Example 2

Stability of the 6 retroreflective ink, coating or paint compositions according to the invention and the 2 comparative compositions described in Example 1 was determined by visual and tactile inspection of whether the sample shows sedimentation, syneresis or separation (phase or otherwise) after a certain number of days. See Table 2. A sample is considered stable if upon visual and tactile inspection no sedimentation, no syneresis and no separation can be observed. A sample is considered spray-stable if it can be sprayed without remixing.

TABLE 2

| | Sample | | | | | | | |
|---|---|---|---|---|---|---|---|---|
| | 1 | 2 | 3 | 4 | 5 | 6 Comp | 7 | 8 Comp. |
| pH t = 0 | n/a | n/a | n/a | 9.6 | 9.5 | 9.3 | 9.5 | 9.5 |
| Days, x | 10 | 10 | 10 | 9 | 8 | 8 | 8 | 8 |
| pH t = x days | n/a | n/a | n/a | 9.7 | 9.5 | 9.4 | 9.7 | 9.5 |
| Stable | yes | yes | yes | yes | yes | no | yes | yes |
| Spray-stable (24 hrs) | yes | yes | yes | yes | yes | yes | yes | yes |

Example 3

The 6 retroreflective ink, coating or paint compositions according to the invention and the 2 comparative compositions described in Example 1 were applied at ambient temperature (about 20° C.) to planar greyish metal test plates (10.5×14.9 cm, with an effective surface area of 154.2 $cm^2$) having a vertical black bar (0.3 cm width) across the whole surface, using a spray gun (DeVILBISS HVLP, DV1-C1 Plus) with a nozzle of 1.3 mm.

Two types of layers were applied; 'normal layers' and 'mist layers'. For 'normal layers', the spray gun was positioned 30 cm apart from the metal test plates and a pressure of 1.8 bar was applied. For 'mist layers', the spray gun was positioned 50 cm apart from the metal test plates and a pressure of 1.3 bar was applied. Good results could be obtained when the test plates were sprayed horizontally from above or below, or vertically.

Subsequent layers were applied 'wet on wet', meaning that a subsequent layer was applied on the previous layer from which at least some to practically all solvent had evaporated but without being (fully) cured. This means that drying time was applied between applying the subsequent layers. Intermediate drying of layers based on organic solvents was performed at a temperature of between 50 and 60° C. for about 10 minutes. Intermediate drying of layers based on water or aqueous solvents was performed at a temperature of between 50 and 60° C. for about 10 minutes.

The weight of the untreated metal plate was taken as a reference. After applying each individual layer and after intermediate drying the weight of the treated metal plate was measured. From these data, one can compute the amount [$g/m^2$] of pigment flakes applied to the metal plate. Given the fact that practically all solvent evaporates during the drying step, one can further compute the amount [$g/m^2$] of the composition applied to the metal plate. In Example 3.1, one normal layer was applied. In Example 3.2, one normal layer and one mist layer were applied. In Example 3.3, two normal layers and one mist layer were applied. Finally, in Example 3.4, three normal layers and one mist layer were applied.

The general (off centre) retroreflectiveness and the coverage of the coated substrates was visually inspected and assessed after complete drying and curing (i.e. after 20 minutes at 60° C.). In addition, the maximum angle of retroreflection [° ] was determined by directing the beam of a torch to the retroreflective layer, wherein the sightline of the eyes substantially coincides with the beam of the torch, and by visually determining whether retroreflection is observed or not. The experiment starts at zero angle with the perpendicular of the coated substrate after which the angle is gradually increased until no retroreflection is discerned anymore.

The qualification '−−−−' means very bad and the qualification '++++' means very good. Very good coverage means that the surface has a homogeneous colour and that the vertical black bar on the test plate is neither visible under normal lighting conditions nor under application of the torch of light when retroreflectiveness is tested. A score of '+' is considered insufficient. Details are presented in Table 3.

TABLE 3

| | Sample | | | | | | | |
|---|---|---|---|---|---|---|---|---|
| | 1 | 2 | 3 | 4 | 5 | Comp. 6 | 7 | Comp. 8 |
| Example 3.1 | | | | | | | | |
| Normal layer 1, dry weight [$g/m^2$] | 61.6 | 52.5 | 46.0 | 38.3 | 38.3 | 13.6 | 37.6 | 35.0 |
| Total amount applied, dry weight [$g/m^2$] | 61.6 | 52.5 | 46.0 | 38.3 | 38.3 | 13.6 | 37.6 | 35.0 |
| Total amount applied, wet weight [$g/m^2$] | 138.8 | 118.0 | 94.0 | 105.1 | 104.5 | 35.7 | 107.1 | 95.0 |
| Total pigment flakes applied [$g/m^2$] | 0.6 | 0.5 | 4.0 | 0.2 | 1.3 | 1.9 | 0.4 | 4.5 |
| Coverage (−−−− to ++++) | + | + | − | +++ | ++ | +++ | −− | ++++ |
| Retroreflectiveness (−−−− to ++++) | ++ | +++ | + | +++ | + | −−− | ++ | + |
| Angle of retroreflection [°] | 0-80 | 0-80 | 0-80 | 0-80 | 0-80 | n/a | 0-80 | 0-80 |
| Example 3.2 | | | | | | | | |
| Normal layer 1, dry weight [$g/m^2$] | 59.7 | 49.3 | 43.5 | 39.6 | 38.3 | 13.6 | 39.6 | 31.1 |
| Mist layer 2, dry weight [$g/m^2$] | 48.0 | 37.0 | 40.9 | 37.0 | 31.8 | 11.0 | 25.9 | 22.7 |
| Total amount applied, dry weight [$g/m^2$] | 107.7 | 86.3 | 84.3 | 76.5 | 70.0 | 24.6 | 65.5 | 53.8 |
| Total amount applied, wet weight [$g/m^2$] | 242.5 | 193.8 | 172.1 | 210.2 | 191.3 | 64.6 | 186.5 | 145.9 |
| Total pigment flakes applied [$g/m^2$] | 1.1 | 0.9 | 7.2 | 0.5 | 2.4 | 3.5 | 0.7 | 6.9 |
| Coverage (−−−− to ++++) | ++ | ++ | + | ++++ | +++ | ++++ | − | ++++ |
| Retroreflectiveness (−−−− to ++++) | ++++ | ++++ | ++ | ++++ | ++ | −−− | +++ | + |
| Angle of retroreflection [°] | 0-80 | 0-80 | 0-80 | 0-80 | 0-80 | n/a | 0-80 | 0-80 |

TABLE 3-continued

| | Sample | | | | | | | |
|---|---|---|---|---|---|---|---|---|
| | 1 | 2 | 3 | 4 | 5 | Comp. 6 | 7 | Comp. 8 |
| Example 3.3 | | | | | | | | |
| Normal layer 1, dry weight [g/m$^2$] | 31.8 | 48.6 | 43.5 | 40.2 | 42.8 | 13.0 | 39.6 | 37.0 |
| Normal layer 2, dry weight [g/m$^2$] | 72.6 | 57.7 | 88.2 | 55.8 | 48.0 | 45.4 | 37.0 | 34.4 |
| Mist layer 3, dry weight [g/m$^2$] | 58.4 | 90.8 | 34.4 | 27.9 | 30.5 | 23.3 | 31.1 | 25.9 |
| Total amount applied, dry weight [g/m$^2$] | 162.8 | 197.1 | 166.0 | 123.9 | 121.3 | 81.7 | 107.7 | 97.3 |
| Total amount applied, wet weight [g/m$^2$] | 366.6 | 443.0 | 338.9 | 340.2 | 331.1 | 214.2 | 306.5 | 263.8 |
| Total pigment flakes applied [g/m$^2$] | 1.6 | 2.0 | 14.3 | 0.8 | 4.2 | 11.5 | 1.2 | 12.4 |
| Coverage (---- to ++++) | ++++ | ++++ | +++ | ++++ | ++++ | ++++ | ++++ | ++++ |
| Retroreflectiveness (---- to ++++) | ++++ | ++++ | ++++ | ++++ | ++++ | ---- | ++++ | + |
| Angle of retroreflection [°] | 0-80 | 0-80 | 0-80 | 0-80 | 0-80 | n/a | 0-80 | 0-80 |
| Example 3.4 | | | | | | | | |
| Normal layer 1, dry weight [g/m$^2$] | 30.5 | 51.2 | 44.1 | 42.2 | 37.0 | 13.0 | 42.2 | 41.5 |
| Normal layer 2, dry weight [g/m$^2$] | 65.5 | 63.6 | 84.3 | 57.7 | 45.4 | 43.5 | 38.3 | 31.8 |
| Normal layer 3, dry weight [g/m$^2$] | 57.1 | 90.8 | 86.9 | 54.5 | 51.9 | 20.1 | 107.7 | 40.2 |
| Mist layer 4, dry weight [g/m$^2$] | 62.9 | 30.5 | 38.9 | 21.4 | 31.8 | 10.4 | 14.9 | 16.2 |
| Total amount applied, dry weight [g/m$^2$] | 216.0 | 236.1 | 254.2 | 175.7 | 166.0 | 86.9 | 203.0 | 129.7 |
| Total amount applied, wet weight [g/m$^2$] | 486.4 | 530.4 | 519.0 | 482.7 | 453.3 | 227.8 | 577.9 | 351.7 |
| Total pigment flakes applied [g/m$^2$] | 2.1 | 2.3 | 21.8 | 1.1 | 5.7 | 12.3 | 2.3 | 16.5 |
| Coverage (---- to ++++) | ++++ | ++++ | +++ | ++++ | ++++ | ++++ | ++++ | ++++ |
| Retroreflectiveness (---- to ++++) | ++++ | ++++ | ++++ | ++++ | ++++ | ---- | ++++ | + |
| Angle of retroreflection [°] | 0-80 | 0-80 | 0-80 | 0-80 | 0-80 | n/a | 0-80 | 0-80 |

It can be concluded from Table 3, Example 3.1, that applying a single normal layer of the compositions according to the invention is typically not enough. Only sample 4 according to the invention provided sufficient results. As expected, the coverage of the comparative compositions (samples 6 and 8) comprising a high concentration of pigment flakes is sufficient. The retroreflectiveness of samples 6 and 8 is however clearly insufficient. As a result, the angle of retroreflection of sample 6 cannot even be determined.

It can also be concluded from Table 3, Examples 3.2-3.4, that applying further layers improves coverage—as a result of applying a higher amount [g/m$^2$] of pigment flakes—but unexpectedly also improves retroreflectiveness of the compositions according to the invention (samples 1-5 and 7). The retroreflectiveness of samples 6 and 8 remains however still clearly insufficient with applying further layers.

It can further be concluded from Table 3 that one can always obtain layers with good or with even very good coverage and retroreflectiveness with the compositions according to the invention by choosing the appropriate amount of layers or layer thickness, resulting in a sufficiently high amount [g/m$^2$] of the pigment flakes having the dimensions as specified hereinbefore. With the comparative compositions with a high concentration of pigment flakes having the dimensions as specified hereinbefore (samples 6 and 8), this unique combination of good coverage and retroreflectiveness cannot be obtained. It was further found that the synthetic pigment flakes and the spherical glass beads synergistically contribute to coverage.

Example 4

The viscosities of the compositions in Table 1 of Example 1 were measured with a Brookfield viscometer using a #5 spindle rotating at 10 rpm at a temperature of about 25° C. and with a Brookfield viscometer using a #3 spindle rotating at 0.5 and 20 rpm at a temperature of about 25° C. Results are given in Table 5 and Table 6. As shown in Table 6, the retroreflective ink, coating or paint compositions according to the invention and the comparative compositions exhibit shear-thinning behaviour.

TABLE 5

| Brookfield viscosity using a #5 spindle rotating at 10 rpm at about 25° C. | |
|---|---|
| Sample | Viscosity [mPa · s] |
| 1 | 600 |
| 2 | 720 |
| 3 | 600 |
| 4 | 600 |
| 5 | 720 |
| Comparative 6 | 240 |
| 7 | 720 |
| Comparative 8 | 720 |

TABLE 6

| Brookfield viscosity using a #3 spindle at about 25° C. | | |
|---|---|---|
| Sample | Viscosity at 0.5 rpm [mPa · s] | Viscosity at 20 rpm [mPa · s] |
| 1 | 6720 | 372 |
| 2 | 7200 | 426 |
| 3 | 5760 | 396 |
| 4 | 2400 | 492 |
| 5 | 2880 | 468 |
| Comparative 6 | 720 | 198 |
| 7 | 3500 | 438 |
| Comparative 8 | 2160 | 492 |

Example 5

Two compositions (Sample 9 and Sample 10) only differing in the size of the synthetic pigment flakes were prepared.

The compositions (weight percentages) are as indicated in Table 7 (wherein the liquid parts of the ingredients are gathered under ‘solvent’ and wherein the weight percentages of the remaining ingredients are indicated with their solids fraction).

TABLE 7

| Ingredients | Sample 9 [wt. %] | Sample 10 [wt. %] |
|---|---|---|
| Syrox S900 binder [(2)] | 5.09 | 5.09 |
| Merck Iriodin 9612 Silver-Grey Fine Satin | 3.00 | |
| Merck Iriodin 9602 Silver-Grey | | 3.00 |
| Syrox S941 thinner [(2)] | 2.55 | 2.55 |
| Solvent [(1)] | 61.90 | 61.90 |
| Acticide MBL [(2)] | 0.04 | 0.04 |
| Glass Beads C - 2.2 | 27.25 | 27.25 |
| AMP Ultra PC 2000 [(2)] | 0.01 | 0.01 |
| ACULYN Excel [(2)] | 0.16 | 0.16 |
| Total | 100.00 | 100.00 |

(1) Solvents added as such and liquid parts from other ingredients (2) The weight percentage is based on dry mass. Solvents are listed separately Both compositions comprise the same concentration and type of synthetic pigment flakes. The only difference between the two compositions is the diameter of the synthetic pigment flakes. The ratio (%) of the average synthetic pigment flake diameter over the median diameter of the spherical glass beads in Sample 9 is 56%, whereas this ratio is 18% in Sample 10.

Both compositions were applied at ambient temperature (about 20° C.) to planar greyish metal test plates (10.5×14.9 cm) having a vertical black bar (0.3 cm width) across the surface, using a spray gun (DV1.2 Mini) with a nozzle of 1.2 mm. Two types of layers were applied; 'normal layers' and 'mist layers'. For 'normal layers', the spray gun was positioned 30-40 cm apart from the metal test plates and a pressure of 2.0 bar was applied. For 'mist layers', the spray gun was positioned 40-50 cm apart from the metal test plates and a pressure of 1.5 bar was applied. The mist layer is a very thin layer of droplets (i.e. not a full layer) that is applied first to improve adhesion.

Drying was applied between applying subsequent 'normal layers'. Both compositions were applied to the greyish metal test plates as a mist layer followed by drying with a subsequent normal layer on top of the mist layer, followed by drying, and by applying a transparent topcoat again followed by drying ['single layer', coatings (b) and (d)]. Both compositions were also applied to further greyish metal test plates as a mist layer with two subsequent normal layers with intermediate drying and final drying, and by applying a transparent topcoat again followed by drying ['multilayer', coatings (a) and (c)].

The general (off centre) retroreflectiveness and the coverage of the coated substrates were visually inspected. Coverage of the coating layers was assessed by checking whether the surface had a homogeneous colour and by checking whether the vertical black bar on the test plate was neither visible under normal lighting conditions (daylight) nor under the application of the torch light ('flash') used to test retroreflectiveness.

Figure 2:
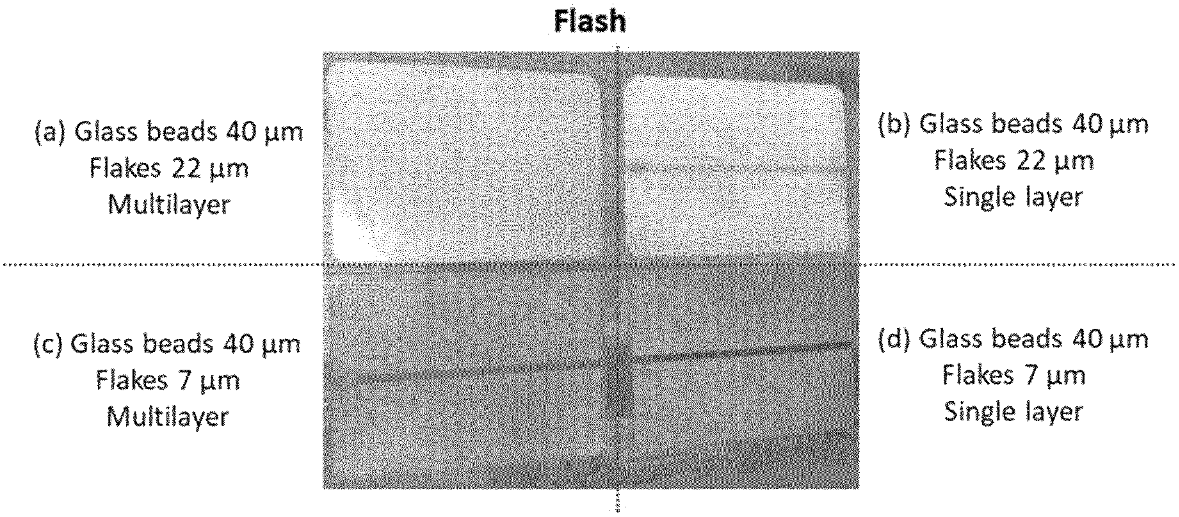
FIG. 2 shows the coverage and retroreflectivity of retroreflective ink, coating or paint compositions under application of torch light ('flash').

FIG. 1 shows the coverage of the coating layers under normal lighting conditions. It is clear that the larger synthetic pigment flakes give a much better coverage, especially when more than one layer is applied. In coating (a), the vertical black bar is hardly noticeable anymore. FIG. 2 shows the coverage and retroreflectivity under application of torch light ('flash'). Again, it is clear that the larger synthetic pigment flakes give a much better coverage, especially when more than one layer is applied. In coating (a), the vertical black bar is hardly noticeable anymore, even under application of the torch light. Moreover, retroreflectiveness is unexpectedly much better for the larger synthetic pigment flakes. Hence, the larger ratio of the synthetic pigment flake diameter to spherical glass bead diameter unexpectedly results in a combination of good coverage and improved retroreflectivity.

The invention claimed is:

1. A composition selected from a retroreflective ink, a coating, or a paint, wherein:

based on the total weight of the composition, the composition consists of:

from 15 wt. % to 75 wt. % solvent;

from 1 wt. % to 80 wt. % spherical glass beads having a median particle diameter D50, as measured with laser diffraction, from 1 μm to 150 μm, and a refractive index, measured at a wavelength 2 of 589 nm, from 1.5 to 2.8;

from 0.05 wt. % to 2.5 wt. % one or more thickeners;

from 0.20 wt. % to 4.5 wt. % synthetic pigment flakes having an average diameter from 1 μm to 75 um, a thickness less than 1 μm, and an aspect ratio of flake diameter to flake thickness of at least 10, from 0 to 2 wt. % of one or more pigment flakes or particles other than the synthetic pigment flakes; and from 0 to 30 wt. % of one or more further ingredients;

the synthetic pigment flakes are chosen from (A), (B), (C), or a combination thereof:

(A) metal flakes or synthetic mica flakes, optionally coated with at least one layer of one or more components selected from the group consisting of metal oxides, metals, metal sulfides, titanium suboxides, titanium oxynitrides, FeO (OH), $SiO_2$, $B_2O_3$, $GeO_2$, $MgF_2$, metal alloys, and rare earth compounds, and optionally coated with an outer layer comprising one or more colorants and a binder;

(B) flakes comprising $Al_2O_3$, $SiO_2$, glass, ceramic, graphite, or mica platelets coated with at least one layer of one or more components selected from the group consisting of metal oxides, metals, metal sulfides, titanium suboxides, titanium oxynitrides, FeO (OH), $SiO_2$, $B_2O_3$, $GeO_2$, metal alloys, and rare earth compounds, and optionally coated with an outer layer comprising one or more colorants and a binder;

(C) flakes comprising $Al_2O_3$ platelets doped with one or more components selected from the group consisting of $TiO_2$, $ZrO_2$, $SiO_2$, $SnO_2$, $In_2O_3$, ZnO, and iron oxide, coated with at least one layer of one or more components selected from the group consisting of metal oxides, metals, metal sulfides, titanium suboxides, titanium oxynitrides, FeO (OH), $SiO_2$, $B_2O_3$, $GeO_2$, metal alloys, rare earth compounds, and optionally coated with an outer layer comprising one or more colorants and a binder;

a combined amount of the synthetic pigment flakes and the one or more pigment flakes or particles in the composition is from 0.20 wt. % to 4.5 wt. %; and the average diameter of the synthetic pigment flakes is greater than 30% of the median particle diameter D50 of the spherical glass beads.

2. The composition of claim 1, wherein:

based on the total weight of the composition, the composition consists of:

from 15 wt. % to 68 wt. % of the solvent;

from 10 wt. % to 50 wt. % of the spherical glass beads;

from 0.05 wt. % to 2.5 wt. % of the one or more thickeners;

from 0.20 wt. % to 4.5 wt. % of the synthetic pigment flakes;

from 0 to 2 wt. % of the one or more pigment flakes or particles other than the synthetic pigment flakes; and from 0 to 30 wt. % of the one or more further ingredients, the average diameter of the synthetic pigment flakes is from 5 μm to 50 μm;

the median particle diameter D50 of the spherical glass beads, as measured with laser diffraction, is from 5 μm to 150 μm; and the combined amount of the synthetic pigment flakes and the one or more pigments flakes or particles in the composition is from 0.20 wt. % to 4.5 wt. %.

3. The composition of claim 1, wherein the average diameter of the synthetic pigment flakes is greater than 33% of the median particle diameter D50 of the spherical glass beads.

4. The composition of claim 1, wherein the spherical glass beads have a refractive index, measured at a wavelength λ of 589 nm from 2.0 to 2.8 or from 1.7 to 2.1.

5. The composition of claim 1, wherein some or all of the spherical glass beads are hemispherically coated with an aluminium coating.

6. The composition of claim 1, comprising synthetic pigment flakes (A), wherein the synthetic pigment flakes (A) are aluminium flakes coated with a $SiO_2$ layer or aluminium flakes coated with a $SiO_2$ layer and are coated with an outer layer comprising one or more colorants and a binder.

7. The composition of claim 1, comprising synthetic pigment flakes (B), wherein the synthetic pigment flakes (B) are selected from the group consisting of $Al_2O_3$flakes coated with $TiO_2$, $Al_2O_3$ flakes coated with $Fe_2O_3$, $Al_2O_3$ flakes coated with a mixture of $TiO_2$ and $Fe_2O_3$, and combinations thereof.

8. The composition of claim 1, comprising synthetic pigment flakes (A), wherein the synthetic pigment flakes (A) are aluminium flakes without any coating or synthetic mica flakes without any coating.

9. The composition of claim 1, wherein:

the solvent is water or an aqueous solvent; and the one or more thickeners are selected from the group consisting of ASE polymers, HASE polymers, HEUR polymers, liquid acrylic crosslinked or copolymer dispersions, acrylates crosspolymers, crosslinked polyacrylic acid polymers, crosslinked polyacrylic acid copolymers, non-ionic aqueous emulsions of a modified ethylene vinyl acetate copolymer wax, modified urea, urea-modified polyamides, and combinations thereof.

10. The composition of claim 1, wherein:

the solvent is an organic solvent; and the one or more thickeners are selected from the group consisting of hydrogenated castor oil, modified hydrogenated castor oil, clay, modified clay, calcium sulfonate complex, organophilic phyllosilicate, silica gel, synthetic amorphous silica, acrylic acid type gellants, modified cellulosic materials, polyurea dispersions, solutions of urea-modified polyamides, polyurethane dispersions, and combinations thereof.

11. The composition of claim 10, wherein the one or more thickeners consists of two thickeners.

12. The composition of claim 1, wherein a combined amount of the synthetic pigment flakes (A), (B), and (C) in the composition is from 0.20 wt. % to 4.0 wt. %, based on the total weight of the composition.

13. The composition of claim 1, wherein:

the amount of the one or more further ingredients in the composition is from greater than 0 to 30 wt. %; and the one or more further ingredients are selected from the group consisting of binders and resins, preservatives, dyes and curing initiators.

14. A process for coating a substrate with a retroreflective layer, the process comprising:

(a) providing a substrate;

(b) optionally applying a primer layer to the substrate of (a);

(c) optionally applying a colored base layer to the substrate of (a) or to the primer layer of (b);

(d) spraying a composition according to claim 1 onto the substrate of (a), or onto the primer layer of (b), or onto the colored base layer of (c), in an amount to provide from 0.25 $g/m^2$ to 30 $g/m^2$ of a combined amount of the synthetic pigment flakes and the one or more pigment flakes or particles other than the synthetic pigment flakes, to obtain a coated substrate;

(e) drying and/or curing the coated substrate obtained in (d) to obtain a dried substrate; and (f) optionally coating the dried substrate coated obtained in (e) with one or more further transparent coating layers, followed by drying and/or curing.

15. A substrate coated with a retroreflective layer obtained by the process according to claim 14.

16. The process according to claim 15, wherein the composition is sprayed onto the substrate in (d) using curtain coating, using a spray gun, a high-speed rotary bell, a high-speed rotating disc, or using a spray can with a propellant.

17. The process according to claim 15, wherein (d) further comprises n subsequent spraying steps, resulting in n layers, wherein each layer x is applied onto at least a part of each layer x−1, where x is an integer from 2 ton, and where n is an integer from 2 to 5.

* * * * *